(12) United States Patent
    Takenaka

(10) Patent No.: US 12,618,513 B2
(45) Date of Patent:        May 5, 2026

(54) GUIDE JIG

(71) Applicant: TOYOTA JIDOSHA KABUSHIKI KAISHA, Toyota (JP)

(72) Inventor: Tetsuhiro Takenaka, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 44 days.

(21) Appl. No.: 18/925,322

(22) Filed: Oct. 24, 2024

(65) Prior Publication Data

US 2025/0043825 A1     Feb. 6, 2025

Related U.S. Application Data

(63) Continuation of application No. 17/937,757, filed on Oct. 3, 2022, now Pat. No. 12,152,635.

(30) Foreign Application Priority Data

Dec. 16, 2021     (JP) ................................. 2021-204617

(51) Int. Cl.
    *F16N 3/10*        (2006.01)
    *F16C 33/66*       (2006.01)
    (Continued)

(52) U.S. Cl.
    CPC ........... *F16N 3/10* (2013.01); *F16H 57/0456* (2013.01); *F16C 33/6622* (2013.01); *F16C 2361/43* (2013.01); *F16D 13/74* (2013.01)

(58) Field of Classification Search
    CPC .... F16C 33/6622; F16C 2361/43; F16N 3/10; F16D 13/74; F16H 57/0456; H02G 3/22; H02G 15/013
    See application file for complete search history.

(56) References Cited

U.S. PATENT DOCUMENTS 1,484,935 A     2/1924  Dunann
1,554,081 A     9/1925  Garrett
              (Continued)

FOREIGN PATENT DOCUMENTS

BR       102019011979 A2     3/2020
BR       112019017071 A2     4/2020
              (Continued)

OTHER PUBLICATIONS

USPTO, Final Office Action issued to U.S. Appl. No. 17/937,757, filed May 2, 2024, 9 pages.
              (Continued)

*Primary Examiner* — Minh Truong
(74) *Attorney, Agent, or Firm* — Hunton Andrews Kurth LLP

(57)        ABSTRACT

There is provided a guide jig including a guide jig body and an engagement portion provided on the guide jig body and configured to be engaged with an engagement partner with the guide jig body positioned with respect to the engagement partner. The guide jig body includes a guide through hole provided as a through hole extending toward a relevant portion with the engagement portion engaged with the engagement partner and configured to guide the direction of insertion of an insertion portion to be inserted into the through hole and moved toward the relevant portion. The engagement portion includes at least two projecting portions. The at least two projecting portions are disposed in line in the direction of insertion. A gap between adjacent projecting portions, among the at least two projecting portions, is set to have a length corresponding to the thickness of the engagement partner.

20 Claims, 30 Drawing Sheets

(51) Int. Cl.
    *F16D 13/74*       (2006.01)
    *F16H 57/04*       (2010.01)

(56)          References Cited

U.S. PATENT DOCUMENTS

| | | | |
|---|---|---|---|
| 2,203,046 A * | 6/1940 | Burford | F16N 7/32 |
| | | | 184/55.1 |
| 2,214,485 A | 9/1940 | Ira | |
| 2,343,492 A | 3/1944 | Bartolett | |
| 2,917,132 A | 12/1959 | Thomas | |
| 3,738,452 A | 6/1973 | Hausinger | |
| 4,141,434 A | 2/1979 | Williams | |
| 5,739,475 A | 4/1998 | Fujisawa et al. | |
| 6,088,874 A | 7/2000 | Nakata et al. | |
| 6,088,876 A | 7/2000 | Daoud | |
| 6,353,185 B1 * | 3/2002 | Sakata | H02G 3/18 |
| | | | 174/152 G |
| 6,901,627 B2 | 6/2005 | Uchida | |
| 8,502,079 B2 * | 8/2013 | Shitamichi | B60R 16/0222 |
| | | | 174/152 G |
| 11,508,499 B2 | 11/2022 | Kiyota et al. | |
| 2003/0127298 A1 | 7/2003 | Grillo | |
| 2005/0175268 A1 | 8/2005 | Latham | |
| 2009/0045270 A1 | 2/2009 | Muljono | |

| | | | |
|---|---|---|---|
| 2009/0218132 A1 * | 9/2009 | Delakowitz | F16L 5/10 |
| | | | 174/669 |
| 2011/0303476 A1 | 12/2011 | Jennings et al. | |
| 2020/0072282 A1 | 3/2020 | Takenaka | |

FOREIGN PATENT DOCUMENTS

| | | | |
|---|---|---|---|
| CN | 108671330 A | 10/2018 | |
| CN | 110873131 A | 3/2020 | |
| DE | 102019208580 A1 | 3/2020 | |
| JP | S5382635 U | 7/1978 | |
| JP | H053244 A | 1/1993 | |
| JP | H07296660 A | 11/1995 | |
| JP | H09102231 A | 4/1997 | |
| JP | H1053247 A | 2/1998 | |
| JP | 2020037949 A | 3/2020 | |
| WO | 2018173083 A1 | 9/2018 | |

OTHER PUBLICATIONS

USPTO, Non-Final Office Action issued to U.S. Appl. No. 17/937,757, filed Dec. 12, 2023, 7 pages.
USPTO, Notice of Allowance issued to U.S. Appl. No. 17/937,757, filed Jul. 25, 2024, 7 pages.

* cited by examiner

GUIDE JIG

CROSS-REFERENCE TO RELATED APPLICATION

This is a continuation application of U.S. patent application Ser. No. 17/937,757, filed Oct. 3, 2022, which claims priority to Japanese Patent Application No. 2021-204617 filed on Dec. 16, 2021, incorporated herein by reference in its entirety.

BACKGROUND

1. Technical Field

The present disclosure relates to a guide jig.

2. Description of Related Art

There has been proposed a device in which a second jig is inserted into a guide through hole of a first jig and moved toward a relevant portion (a portion at which grease needs to be supplied from a distal end portion of a greasing pipe of the second jig) until a predetermined position relationship is established between the distal end portion of the greasing pipe and the relevant portion (see Japanese Unexamined Patent Application Publication No. 2020-37949 (JP 2020-37949 A), for example).

SUMMARY

However, J P 2020-37949 A does not specifically describe engaging (fixing) the first jig with an engagement partner in the state of being positioned with respect to the engagement partner. There is room for consideration.

The present disclosure provides a guide jig (e.g. a first jig) to be engaged (fixed) with an engagement partner in the state of being positioned with respect to the engagement partner.

An aspect of the present disclosure relates to a guide jig including a guide jig body and an engagement portion. The engagement portion is provided on the guide jig body, and configured to be engaged with an engagement partner with the guide jig body positioned with respect to the engagement partner. The guide jig body includes a guide through hole provided as a through hole extending toward a relevant portion with the engagement portion engaged with the engagement partner and configured to guide a direction of insertion of an insertion portion to be inserted into the through hole and moved toward the relevant portion. The engagement portion includes at least two projecting portions. The at least two projecting portions are disposed in line in the direction of insertion. A gap between adjacent projecting portions, among the at least two projecting portions, is set to have a length corresponding to a thickness of the engagement partner.

With the guide jig according to the aspect described above, it is possible to provide a guide jig (e.g. a first jig) to be engaged (fixed) with an engagement partner in the state of being positioned with respect to the engagement partner. This is because the at least two projecting portions are disposed in line in the direction of insertion and the gap between adjacent projecting portions, among the at least two projecting portions, is set to have a length corresponding to the thickness of the engagement partner.

In the guide jig according to the above aspect, the engagement portion may include at least three projecting portions; the at least three projecting portions may be disposed in line in the direction of insertion; and gaps between adjacent projecting portions, among the at least three projecting portions, may be set to have different lengths.

In the guide jig configured as described above, projection lengths of projecting portions positioned at both ends in the direction of insertion, among the at least three projecting portions, may be longer than a projection length of the other projecting portion.

In the guide jig according to the above aspect, a gap between adjacent projecting portions, among the at least two projecting portions, may become wider toward distal ends of the projecting portions.

In the guide jig configured as described above, one projecting portion of the adjacent projecting portions may be inclined with respect to the other projecting portion.

In the guide jig configured as described above, the one projecting portion or the other projecting portion of the adjacent projecting portions may have been notched to abut against at least a part of the engagement partner to be inserted into the gap.

With the present disclosure, it is possible to provide a guide jig (e.g. a first jig) to be engaged (fixed) with an engagement partner in the state of being positioned with respect to the engagement partner.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A greasing device for a clutch release mechanism according to a first embodiment of the present disclosure will be specifically described below with reference to the drawings. The present disclosure is not limited to embodiments described below.

The greasing device according to the first embodiment of the present disclosure will be described below. The greasing device according to the first embodiment is used to perform inspection and maintenance with grease ejection at a low cost and in a short time for poor sliding (e.g. poor sliding that accompanies increased friction, abnormal sound, etc.) caused by an outflow of grease from a fork portion in a manual transmission clutch housing to be lubricated with grease or intrusion of foreign matter after a manual transmission vehicle is damaged with water or travels to cross a river.

Figure 1:
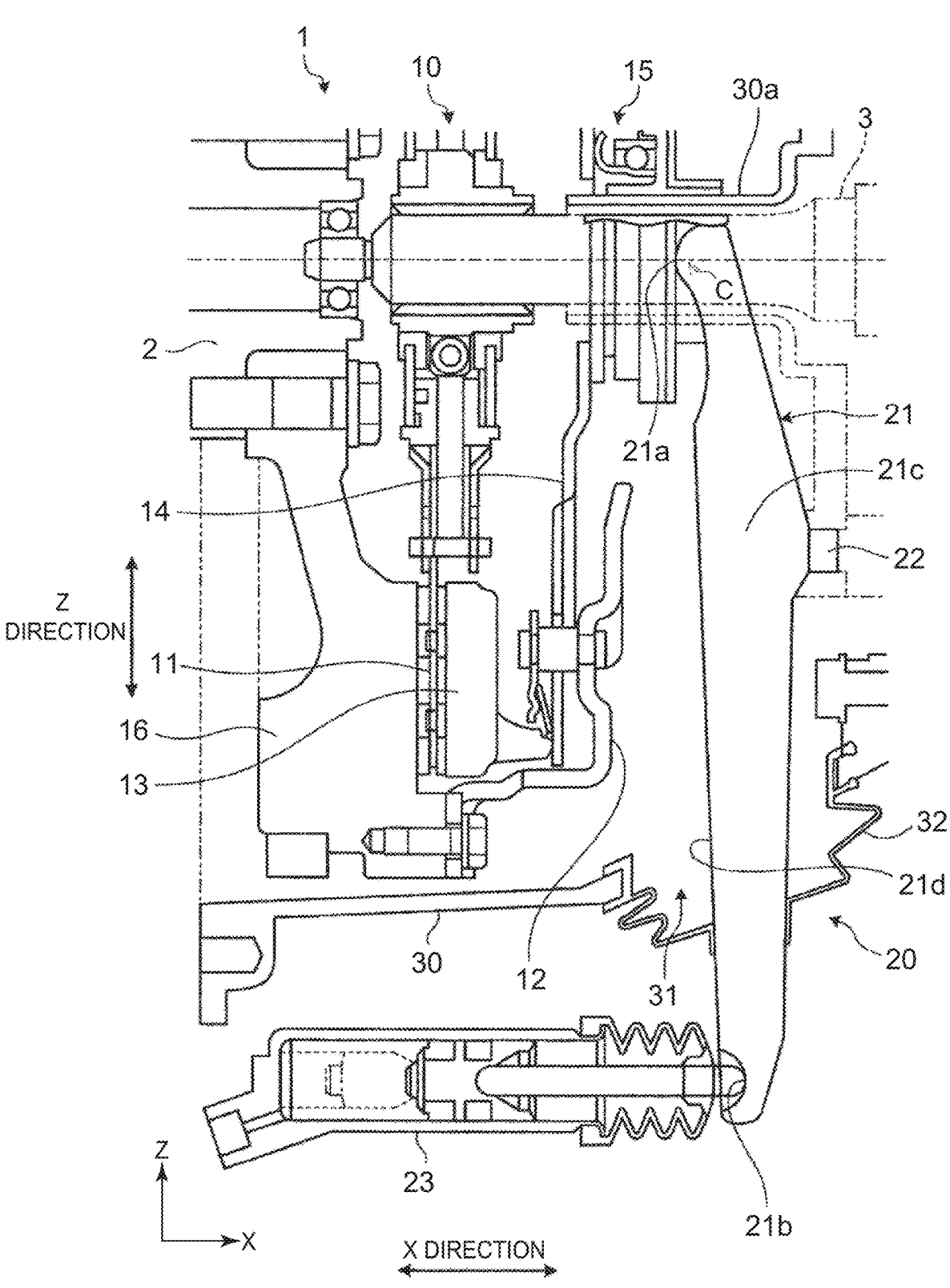
FIG. 1 schematically illustrates a clutch release mechanism according to a first embodiment of the present disclosure.

FIG. 1 schematically illustrates a clutch release mechanism according to the first embodiment. As illustrated in FIG. 1, a clutch device 1 is configured to include a clutch body 10 that operates to transmit and block power, a clutch release mechanism 20 for operating the clutch body 10, and a clutch housing 30 that houses the clutch body 10 therein. The clutch device 1 is mounted on a manual transmission vehicle, and disposed between an engine and a transmission, for example.

The X direction indicated in FIG. 1 represents an axial direction that extends along the central axis, and the Z direction represents a direction (occasionally referred to as a "radial direction" or a "height direction") that is orthogonal to the central axis. When the Z direction corresponds to the height direction, the upper side and the lower side are occasionally indicated as a "distal end side" and a "base end side", respectively. Further, the Y direction to be discussed later represents a direction that is orthogonal to the X direction and the Z direction. The Y direction is occasionally indicated as a "width direction".

The clutch body 10 includes a clutch disk 11, a clutch cover 12, a pressure plate 13, a diaphragm spring 14, and a release bearing 15.

The clutch disk 11 has a friction surface (clutch facing) interposed between the pressure plate 13 and a flywheel 16, and is spline-fitted with an input shaft 3 of the transmission. Rotation of the flywheel 16 is transferred to the input shaft 3 by a friction force between the friction surface of the clutch disk 11 and the flywheel 16. The flywheel 16 is bolted to a crankshaft 2 of the engine so that the flywheel 16 and the crankshaft 2 are rotated together with each other.

The clutch cover 12 is provided so as to cover the outer peripheral side of the clutch disk 11, and rotated together with the pressure plate 13 and the diaphragm spring 14. The pressure plate 13 is provided between the friction surface of the clutch disk 11 and the diaphragm spring 14. The diaphragm spring 14 is a member that presses the friction surface of the clutch disk 11 toward the flywheel 16 via the pressure plate 13, and is provided on the opposite side of the friction surface of the clutch disk 11 from the pressure plate 13. The peripheral edge portion of the diaphragm spring 14 is connected to the pressure plate 13. The center portion of the diaphragm spring 14 is connected to the release bearing 15. This enables the diaphragm spring 14 to press the pressure plate 13.

When the clutch body 10 is engaged, the pressure plate 13 presses the friction surface of the clutch disk 11 toward the flywheel 16 using the elastic force of the diaphragm spring 14. Consequently, a friction force is generated between the friction surface of the clutch disk 11 and the flywheel 16, establishing a connected state in which rotation of the flywheel 16 is transferred to the clutch disk 11.

When the clutch body 10 is disengaged, the peripheral edge portion of the diaphragm spring 14 is displaced in the direction of moving away from the flywheel 16 with the release bearing 15 pressing the center portion of the diaphragm spring 14. At this time, the pressure plate 13 is drawn in the direction of moving away from the flywheel 16 together with the diaphragm spring 14. Consequently, the friction force between the friction surface of the clutch disk 11 and the flywheel 16 is resolved, establishing a disconnected state in which rotation of the flywheel 16 is not transferred to the clutch disk 11.

The clutch release mechanism 20 includes a clutch release fork 21, a release fork support 22, and a release cylinder 23.

The clutch release fork 21 is a member for moving the release bearing 15 in the axial direction, and is configured to be swingable in the state of being supported by the release fork support 22. The clutch release fork 21 is an elongated member made of metal, and is structured to be bifurcated on the distal end side.

As illustrated in FIG. 1, one end side of the clutch release fork 21 is constituted by a pressing portion 21a that presses the release bearing 15 in the axial direction. The pressing portion 21a is configured to have a bifurcated structure in which the distal end side of the pressing portion 21a is bifurcated so as to interpose the input shaft 3 inside the clutch housing 30. A portion (abutment portion) of the pressing portion 21a that faces the release bearing 15 in the axial direction contacts the release bearing 15. The other end side of the clutch release fork 21 is constituted by a connection portion 21b that projects to the outside of the clutch housing 30 via a through hole 31 of the clutch housing 30 to be connected to the release cylinder 23. The other end side of the clutch release fork 21 is covered by a fork boot 32 at a position outside the clutch housing 30. The fork boot 32 is attached to the through hole 31. The fork boot 32 may be provided with a hole (cooling hole) that releases friction heat, which is generated when the clutch body 10 is brought into a half-engaged state, to the outside of the clutch housing 30.

Further, the clutch release fork 21 has a fulcrum portion 21c, at which the clutch release fork 21 is supported by the release fork support 22, between the pressing portion 21a and the connection portion 21b. The release fork support 22 is constituted from a body portion fixed to a partition wall of the clutch housing 30 and a pivot portion (not illustrated) that has a spherical surface on the distal end side of the body portion. The partition wall of the clutch housing 30 is constituted by a retainer, to which a bearing (not illustrated) that supports the input shaft 3 is attached. The retainer is a member fixed to the clutch housing 30. The root side of the release fork support 22 is bolted to the retainer. A boss portion 30a of the retainer extends along the input shaft 3 inside the clutch housing 30. The input shaft 3 is inserted through the inside of the boss portion 30a.

The release bearing 15 is configured to be movable in the axial direction with respect to the boss portion 30a in the state of being supported on the outer periphery of the boss portion 30a via a sleeve. The release bearing 15 is disposed so as to contact the center portion of the diaphragm spring 14. The release bearing 15 has an outer ring supported by the sleeve on the boss portion 30a and an inner ring that contacts the center portion of the diaphragm spring 14. The inner ring of the release bearing 15 which contacts the diaphragm spring 14 is rotated, and the outer ring thereof which contacts the clutch release fork 21 is not rotated.

The release cylinder 23 is actuated when a driver depresses a clutch pedal (not illustrated). When the connection portion 21b is operated by the release cylinder 23, the clutch release fork 21 is swung about the fulcrum portion 21c. With this swinging motion, the pressing portion 21a presses the release bearing 15, which moves the release bearing 15 in the axial direction to press the center portion of the diaphragm spring 14 toward the flywheel 16, which brings the clutch body 10 into the disengaged state. When the clutch body is brought into the disengaged state, the flywheel 16 and the clutch disk 11 are disengaged from each other so as not to be able to transfer power. When an operation force from the release cylinder 23 is canceled, no pressing force acts on the release bearing 15 from the pressing portion 21a, which brings the clutch body 10 into the engaged state. When the clutch body 10 is brought into the engaged state, the flywheel 16 and the clutch disk 11 are engaged with each other so as to be able to transfer power. In this manner, a power transfer path between the crankshaft 2 on the engine side and the input shaft 3 on the transmission side is engaged and disengaged by swinging motion of the clutch release fork 21.

Next, a greasing device 100 according to the first embodiment will be described. The greasing device 100 is a device that supplies grease to a contact portion between the pressing portion 21a of the clutch release fork 21 and the release bearing 15. The greasing device 100 is configured to insert a second jig 120 (insertion portion 121) into a guide through hole (first hole 113, second hole 114) of a first jig 110, which is fixed to the clutch housing 30 as discussed later, and to move the second jig 120 (insertion portion 121) toward a relevant portion C until a predetermined position relationship is established between a distal end portion 131 of a greasing pipe 130 provided on the second jig 120 and the relevant portion C. As illustrated in FIG. 1, the relevant portion C refers to a contact portion between the clutch release fork 21 (pressing portion 21a) and the release bearing 15, which is a portion that needs greasing (that needs to be supplied with grease from the distal end portion 131 of the greasing pipe 130). As illustrated in FIG. 1, the relevant portion C is disposed in an internal space surrounded by the clutch housing 30 (an example of a cover member according to the present disclosure). A jig fixing through hole (through hole 31) that communicates with the internal space is formed in the clutch housing 30.

When a vehicle on which the clutch device 1 is mounted is used in an environment with the presence of sand, muddy water, etc., foreign matter may intrude into the clutch housing 30 through the cooling hole in the fork boot 32 discussed above, a cooling hole provided in the clutch housing 30, or an opening portion for drainage (not illustrated). Therefore, it is desired to perform greasing maintenance in which the clutch release mechanism 20 is maintained by additionally supplying grease to the contact portion between the clutch release fork 21 and the release bearing 15. Thus, the greasing device 100 is configured to be able to perform greasing maintenance without the need to remove the clutch housing 30 (or a manual transmission unit including the clutch housing 30) from the vehicle. The greasing device 100 supplies grease to the contact portion between the clutch release fork 21 and the release bearing 15, which is a portion that needs greasing, from the outside of the clutch housing 30 via the through hole 31 of the clutch housing 30 using the greasing pipe 130 (illustrated in FIG. 2 etc.).

Figure 2:
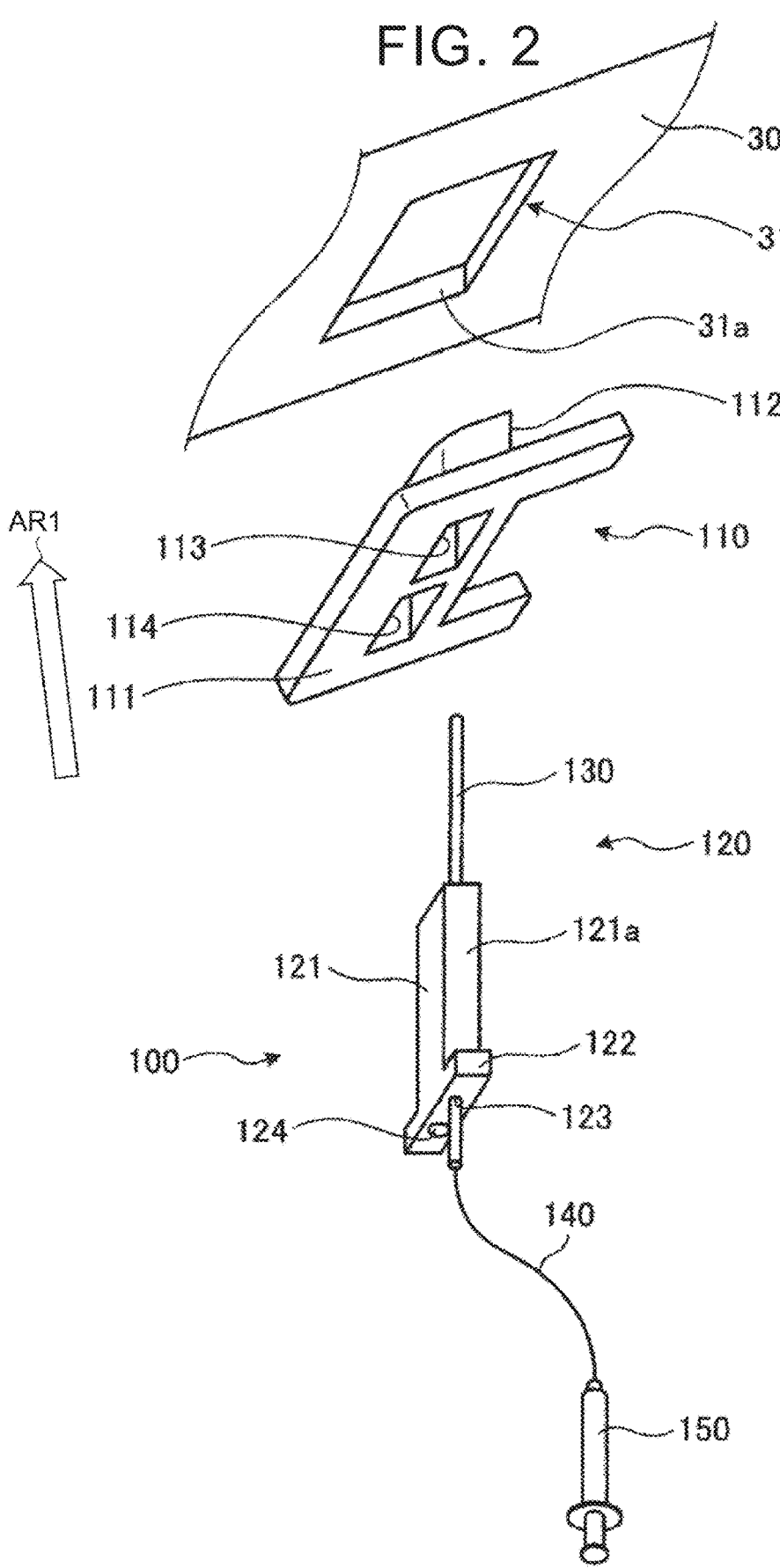
FIG. 2 schematically illustrates a greasing device according to the first embodiment.

As illustrated in FIG. 2, the greasing device 100 is configured to include a first jig 110, a second jig 120, a greasing pipe 130, a flexible pipe 140, and a greasing unit 150. The first jig 110 and the second jig 120 are members for positioning the greasing pipe 130. The first jig 110 is a member to be attached to the through hole 31 of the clutch housing 30. The second jig 120 is a member to be inserted through an insertion hole of the first jig 110.

The first jig 110 is a guide jig that regulates the direction (direction of insertion) of the greasing pipe 130 (grease ejection pipe), and includes a base portion 111, a projecting portion 112, and a first hole 113 and a second hole 114 as positioning holes. The first jig 110 is an integrally molded product made of metal. The base portion 111 is formed in a flat plate shape, and is shaped to be able to cover a part of the opening portion of the through hole 31. The width (length in the Y direction to be discussed later) of the base portion 111 is larger than the opening width of the through hole 31. The projecting portion 112 is a portion that projects from the base portion 111 to be inserted into the through hole 31. The projecting portion 112 functions as a positioning portion that positions the first jig 110 by abutting against an inner surface 31a of the through hole 31 and abutting against a flat surface 21d of the clutch release fork 21.

The first hole 113 and the second hole 114 are insertion holes into which the greasing pipe 130 and the insertion portion 121 of the second jig 120 are to be inserted, and are positioning holes for positioning the greasing pipe 130. The first hole 113 and the second hole 114 are through holes formed side by side in the width direction of the first jig 110 to penetrate the first jig 110 from the base portion 111 on the base end side toward the projecting portion 112 on the distal end side. In the description herein, the first hole 113 and the second hole 114 are referred to as "insertion holes" if not specifically distinguished from each other.

The second jig 120 includes an insertion portion 121 in a rectangular column shape to be inserted into the first hole 113 and the second hole 114 of the first jig 110 and a stopper portion 122 that abuts against a surface 111a of the first jig 110. The second jig 120 is an integrally molded product made of metal. The greasing pipe 130 is integrated with the second jig 120. The second jig 120 has two through holes 123 and 124 that extend linearly along the insertion portion 121 from the base end side to the distal end side. One through hole 123 is a hole for a greasing pipe. The other through hole 124 is a hole for an endoscope. The greasing pipe 130 is fixed in the state of being inserted through the through hole 123. An endoscope 160 is fixed in the state of being inserted through the through hole 124 (see FIG. 3). The stopper portion 122 has a stopper surface 122a (illustrated in FIG. 3) that abuts against the surface 111a of the first jig 110.

The greasing pipe 130 is a pipe for supplying grease to the contact portion between the pressing portion 21a of the clutch release fork 21 and the release bearing 15 inside the clutch housing 30. The greasing pipe 130 is an elongated ejection portion that includes the distal end portion 131 for ejecting grease (an example of a fluidic substance according to the present disclosure). The greasing pipe 130 is made of metal. An opening portion 131a through which grease is to be ejected is provided at the distal end portion 131 of the greasing pipe 130. A flexible pipe 140 is connected to the base end side of the greasing pipe 130. The greasing pipe 130 is connected to the greasing unit 150 via the flexible pipe 140.

Figure 3:
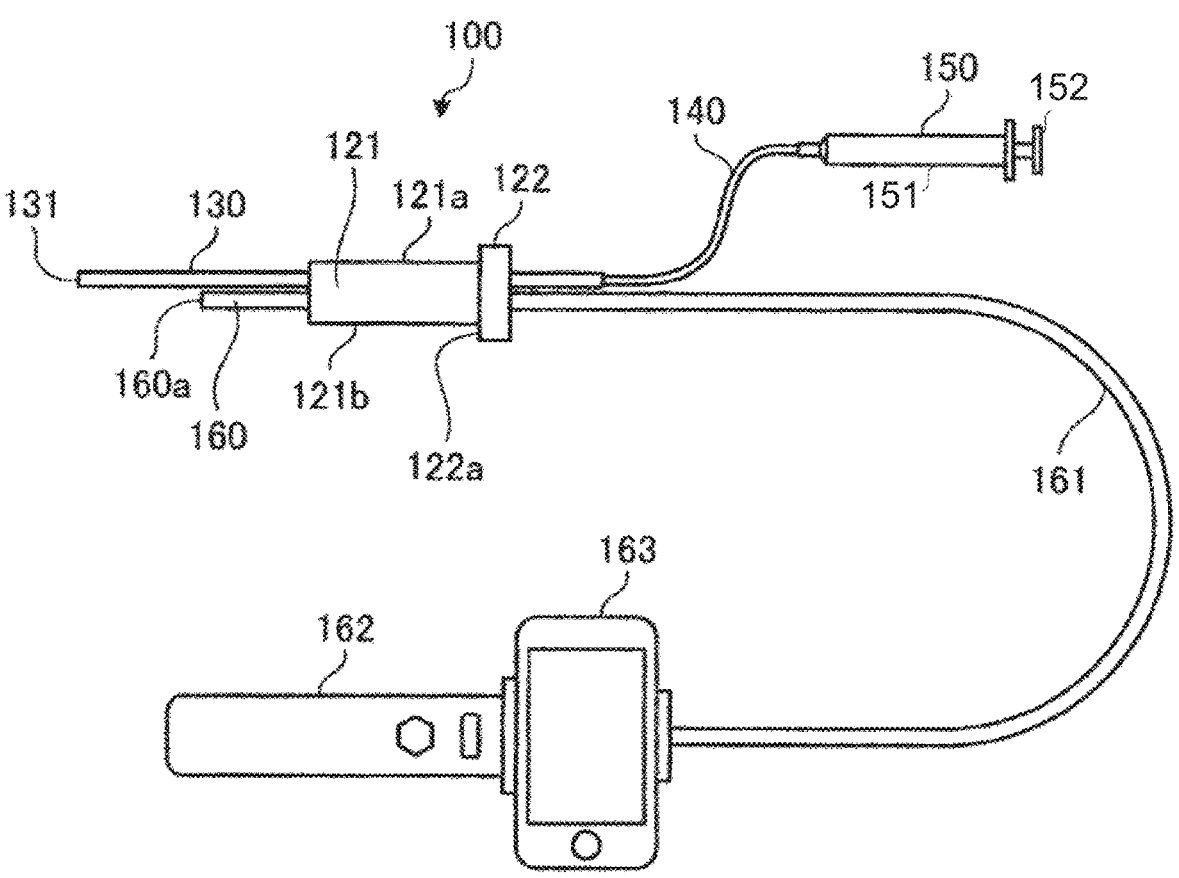
FIG. 3 is a schematic view illustrating the greasing device.

As illustrated in FIG. 3, the greasing device 100 includes the endoscope 160 as an imaging unit. The endoscope 160 is an elongated imaging device that includes, at a distal end portion 160a, an imaging portion that captures an image that includes the distal end portion 131 of the greasing pipe 130 and a surrounding structure thereof (e.g. the relevant portion C). The endoscope 160 is an example of an imaging device according to the present disclosure. The endoscope 160 is integrated with the second jig 120, and projects from the distal end side of the insertion portion 121. The distal end side of the endoscope 160 is a portion to be inserted into the clutch housing 30. A lens is provided at the distal end portion 160a. The base end side of the endoscope 160 is connected to an operation portion 162 via a cable 161. The internal structure of the clutch housing 30 can be imaged using the endoscope 160 by operating the operation portion 162. An image captured by the endoscope 160 (e.g. an image that includes the distal end portion 131 of the greasing pipe 130 and a surrounding structure thereof (e.g. the relevant portion C)) can be displayed on a display portion 163 attached to the operation portion 162.

The greasing unit 150 is constituted from a cylinder 151 and a push rod 152 (piston) (see FIG. 3). The flexible pipe 140 is connected to the cylinder 151 of the greasing unit 150. Grease can be supplied from the greasing unit 150 to the greasing pipe 130 by pressing the push rod 152 with the cylinder 151 filled with the grease. Greasing can be performed smoothly by inserting the greasing pipe 130 into the clutch housing 30 through the through hole 31 with the greasing pipe 130 and the flexible pipe 140 filled with grease in advance and operating the greasing unit 150, for example.

Figure 4A:
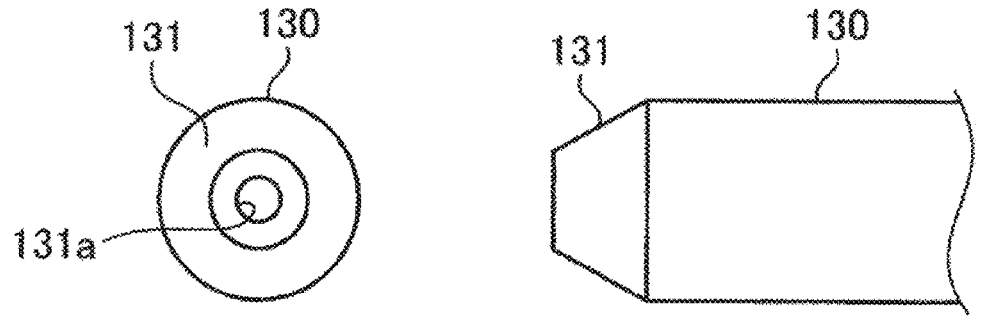
FIG. 4A illustrates an example of an opening portion of a greasing pipe illustrated in FIG. 3.
Figure 4B:
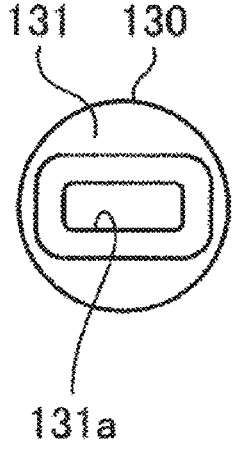
FIG. 4B illustrates another example of the opening portion of the greasing pipe.
Figure 4B:
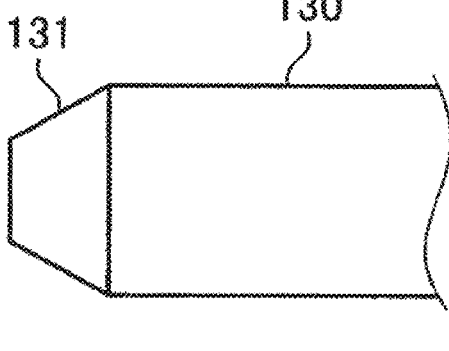

The distal end portion 131 of the greasing pipe 130 has a tapered shape, and includes the opening portion 131a through which grease is to be ejected. The opening portion 131a of the greasing pipe 130 may be circular as illustrated in FIG. 4A, for example. Alternatively, the opening portion 131a may be flattened as illustrated in FIG. 4B. It is possible to supply grease to the portion that needs greasing through a narrow space in the clutch housing 30 when the distal end portion 131 of the greasing pipe 130 has a tapered shape.

Figure 5:
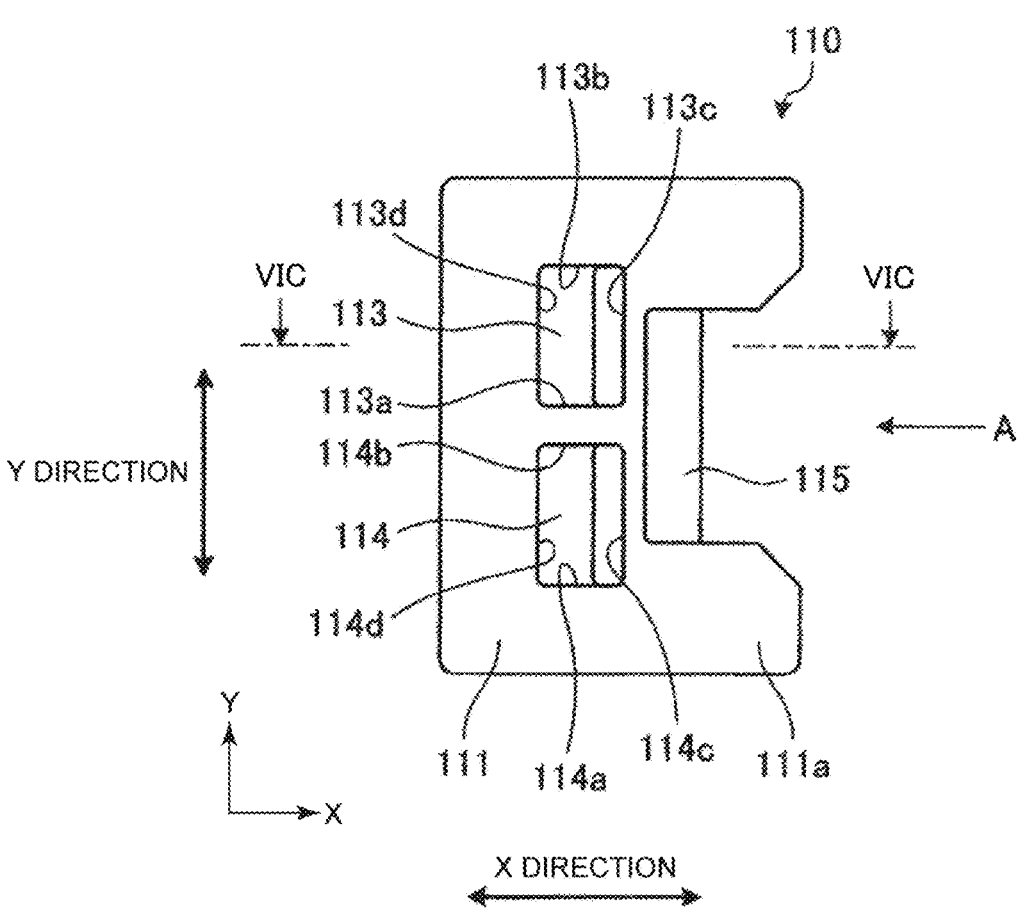
FIG. 5 is a plan view of the base end side of the first jig illustrated in FIG. 2.
Figure 6A:
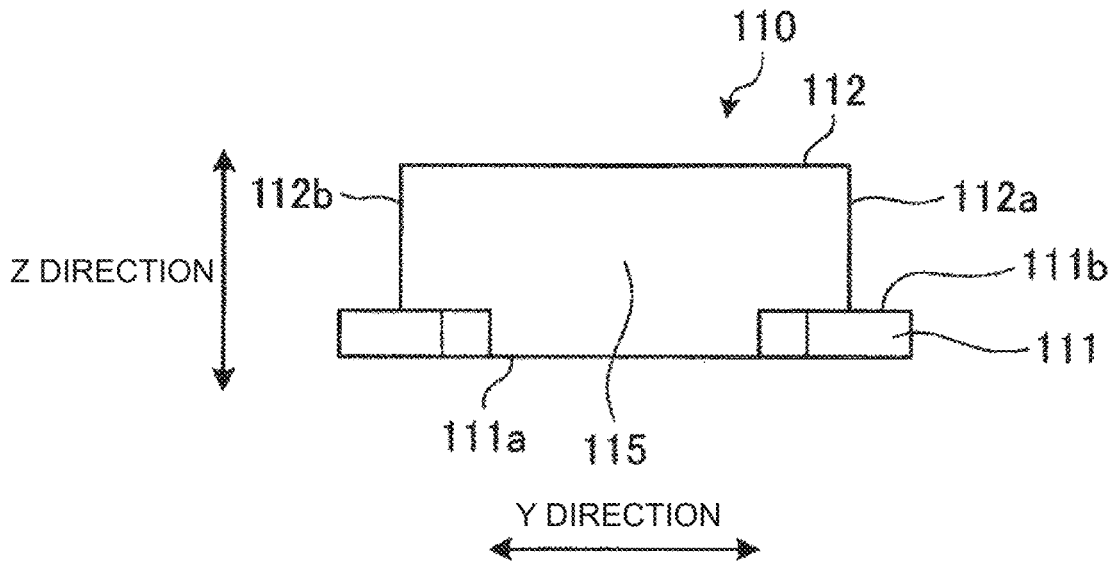
FIG. 6A is a view seen along the arrow A in FIG. 5.
Figure 6B:
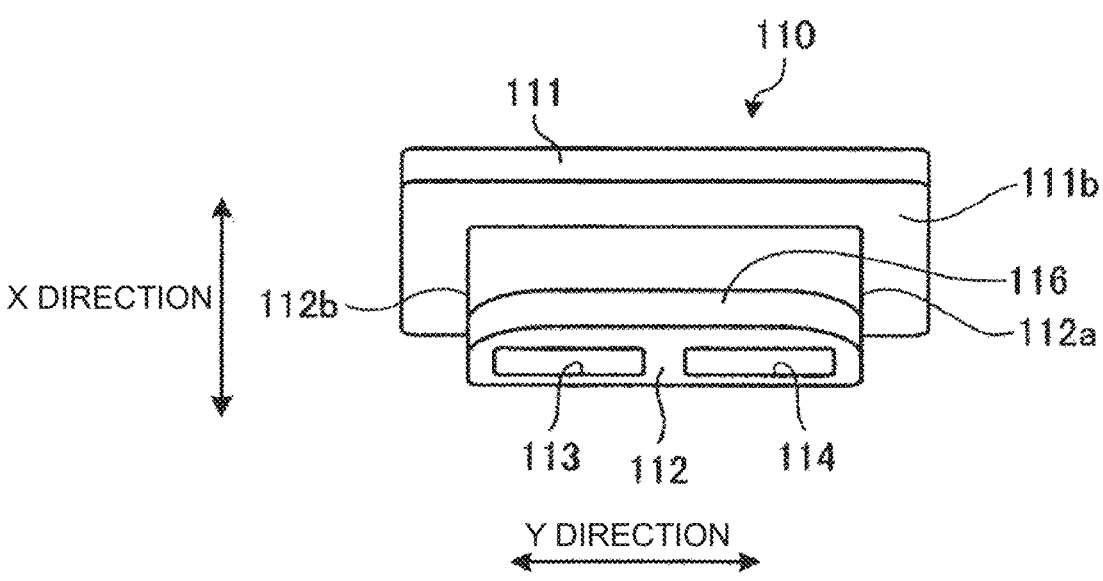
FIG. 6B is a perspective view of the first jig as seen from the back surface side.
Figure 6C:
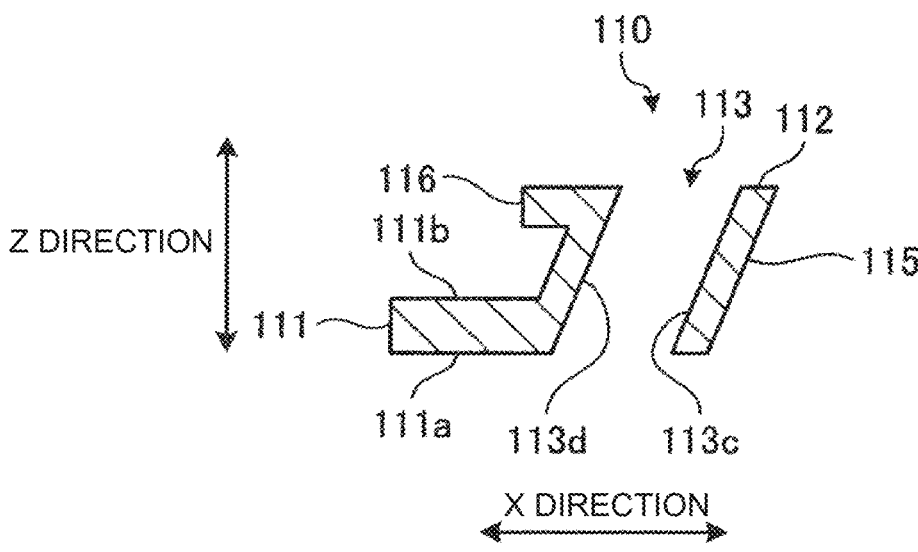
FIG. 6C illustrates a sectional surface taken along the VIC-VIC line in FIG. 5.

The first jig 110 will be described in detail with reference to FIGS. 5 and 6A to 6C. FIG. 5 is a plan view of the base end side of the first jig 110. FIG. 6A is a view seen along the arrow A in FIG. 5. FIG. 6B is a perspective view of the first jig 110 as seen from the back surface side. FIG. 6C illustrates a sectional surface taken along the VIC-VIC line in FIG. 5.

As illustrated in FIG. 5, the first jig 110 has rectangular openings of the first hole 113 and the second hole 114 on the surface 111a side of the base portion 111. The inner surface of the first hole 113 is a surface that functions as a guide surface against which the insertion portion 121 abuts to position the greasing pipe 130, and includes a first surface 113a, a second surface 113b, a third surface 113c, and a fourth surface 113d. The first surface 113a and the second surface 113b face each other in the Y direction, and correspond to the short sides of the rectangular shape. The third surface 113c and the fourth surface 113d face each other in the X direction, and correspond to the long sides of the rectangular shape. The inner surface of the second hole 114 is a surface that functions as a guide surface for positioning the greasing pipe 130, and includes a first surface 114a, a second surface 114b, a third surface 114c, and a fourth surface 114d. The first surface 114a and the second surface 114b face each other in the Y direction, and correspond to the short sides of the rectangular shape. The third surface 114c and the fourth surface 114d face each other in the X direction, and correspond to the long sides of the rectangular shape.

Further, the first jig 110 has an abutment surface 115 that abuts against the flat surface 21d of the clutch release fork 21. The abutment surface 115 is a positioning surface, and can determine the position of the first jig 110 in the X direction by abutting against the flat surface 21d of the clutch release fork 21. As illustrated in FIG. 6A, the abutment surface 115 has a predetermined width in the width direction (Y direction) of the base portion 111, and extends along the height direction (Z direction) of the projecting portion 112.

As illustrated in FIG. 6B, a key portion 116 is provided on a back surface 111*b* side of the first jig 110. The key portion 116 is a portion to be caught on the clutch housing 30 when the projecting portion 112 is inserted into the through hole 31. The key portion 116 functions as a portion that holds the first jig 110 in the through hole 31. Opening portions of the first hole 113 and the second hole 114 that open in the projecting portion 112 also have a rectangular shape as with the base end side. As illustrated in FIG. 6C, the first hole 113 extends linearly inside the projecting portion 112.

Figure 7:
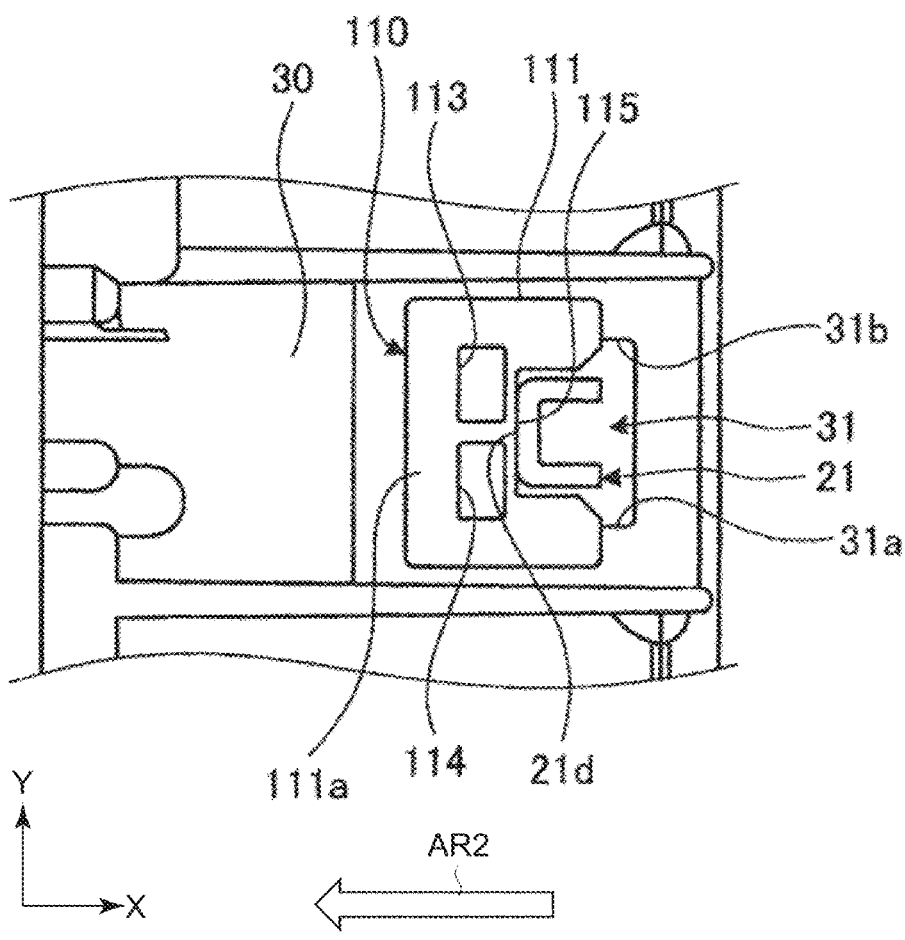
FIG. 7 illustrates a state in which the first jig is attached to a through hole of a clutch housing illustrated in FIG. 1.
Figure 8:
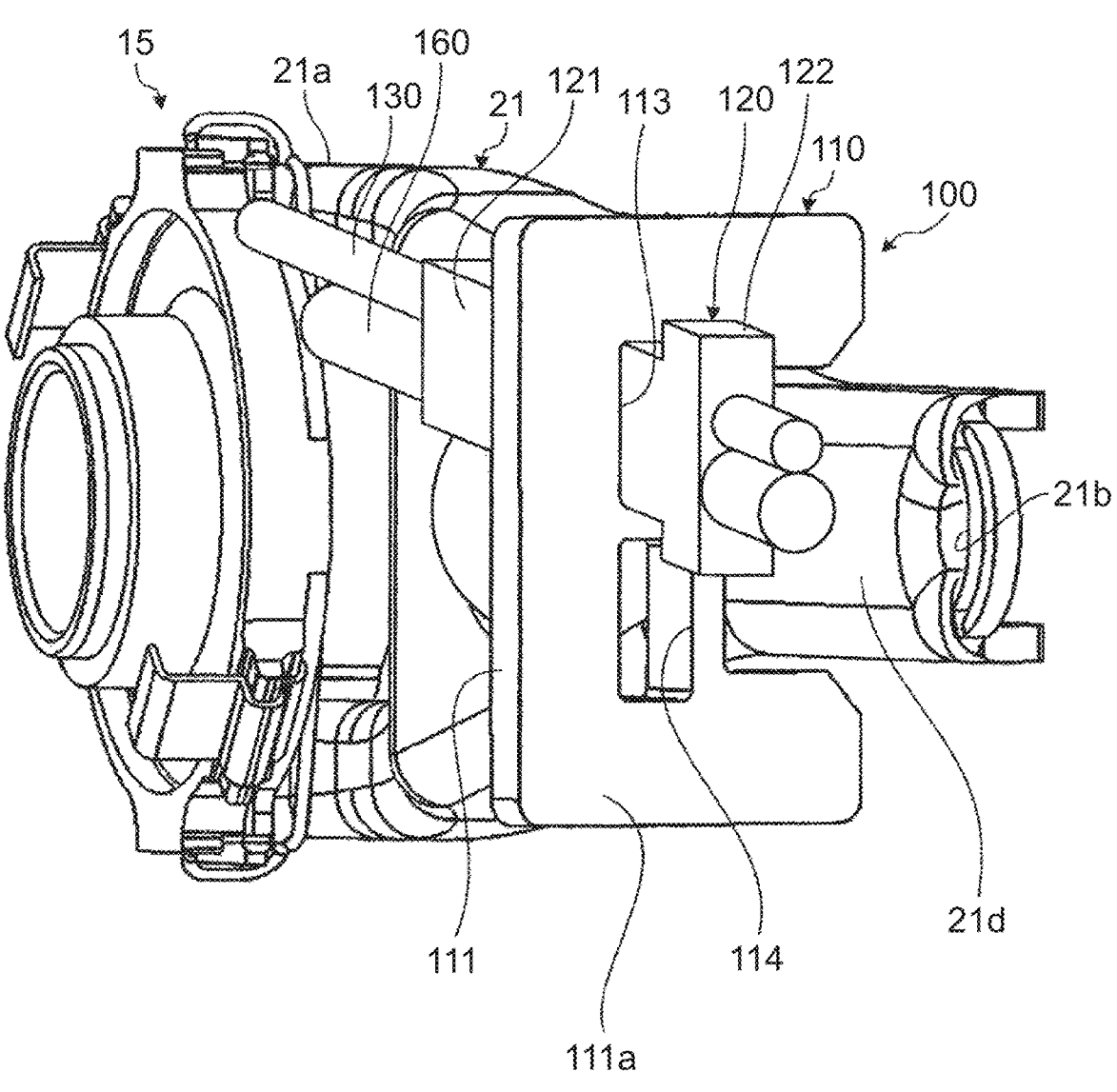
FIG. 8 illustrates a state in which the greasing pipe extends toward a pressing portion of a clutch release fork with a second jig inserted into an insertion hole of the first jig.
Figure 9:
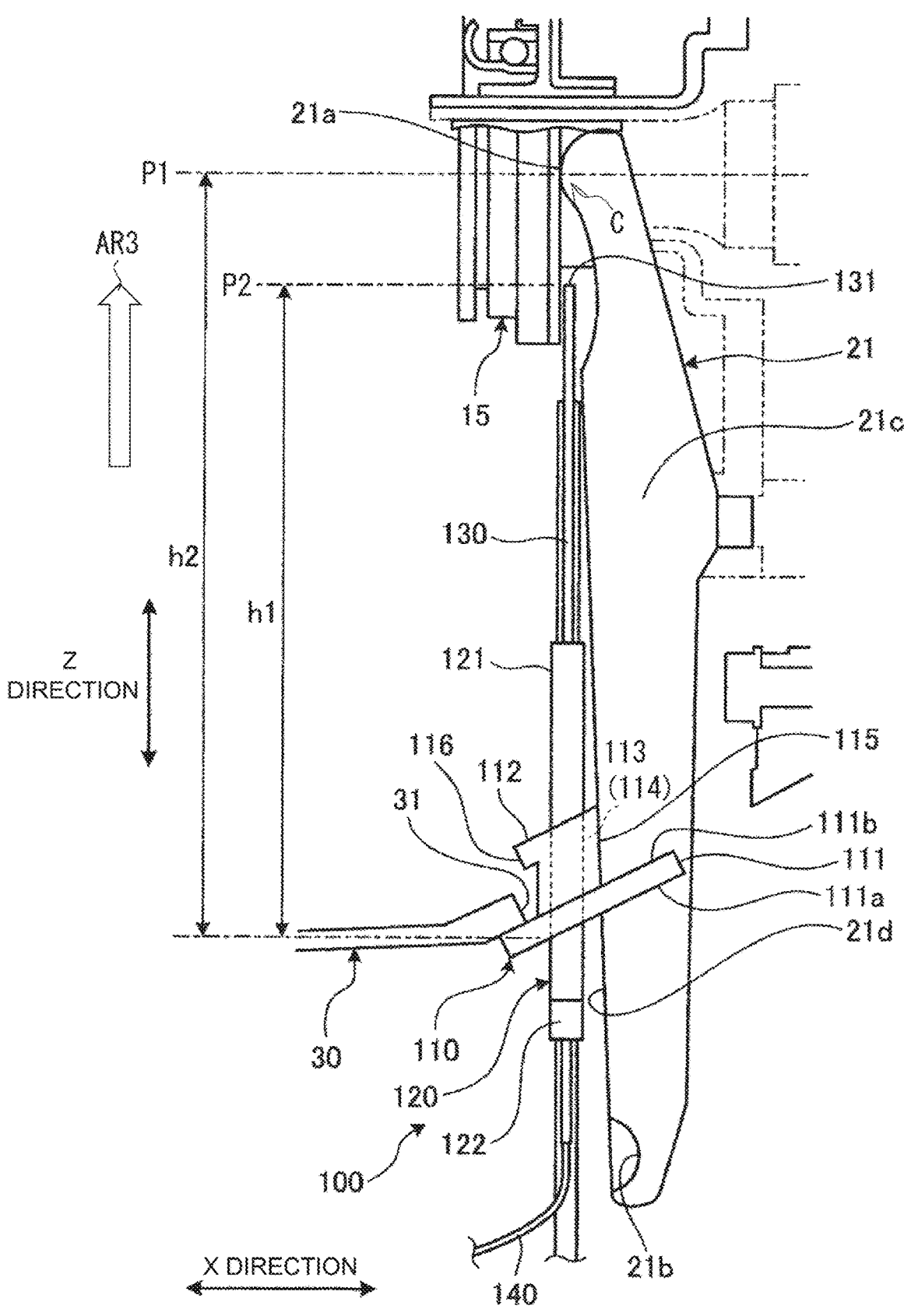
FIG. 9 illustrates the height of the distal end portion of the greasing pipe.
Figure 10A:
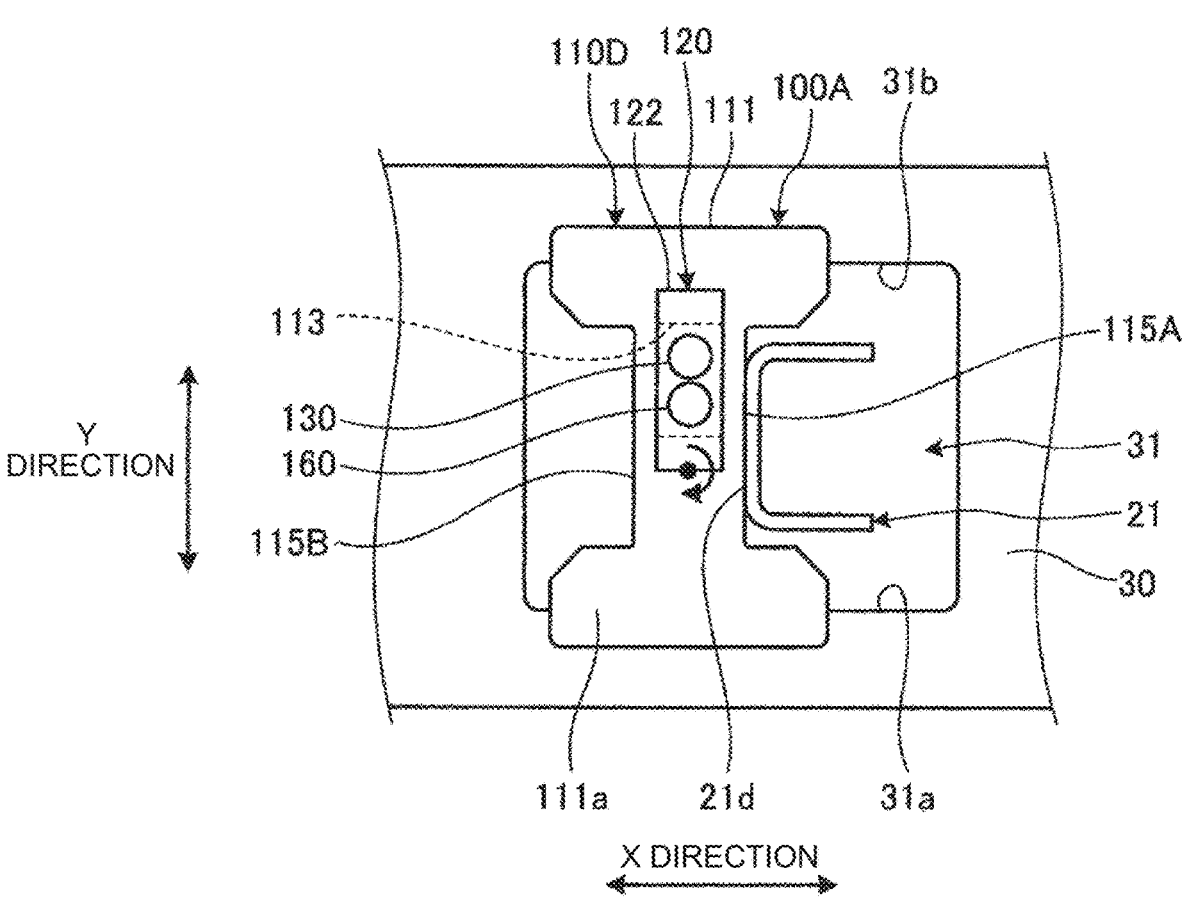
FIG. 10A schematically illustrates the first jig according to a first modification.
Figure 10B:
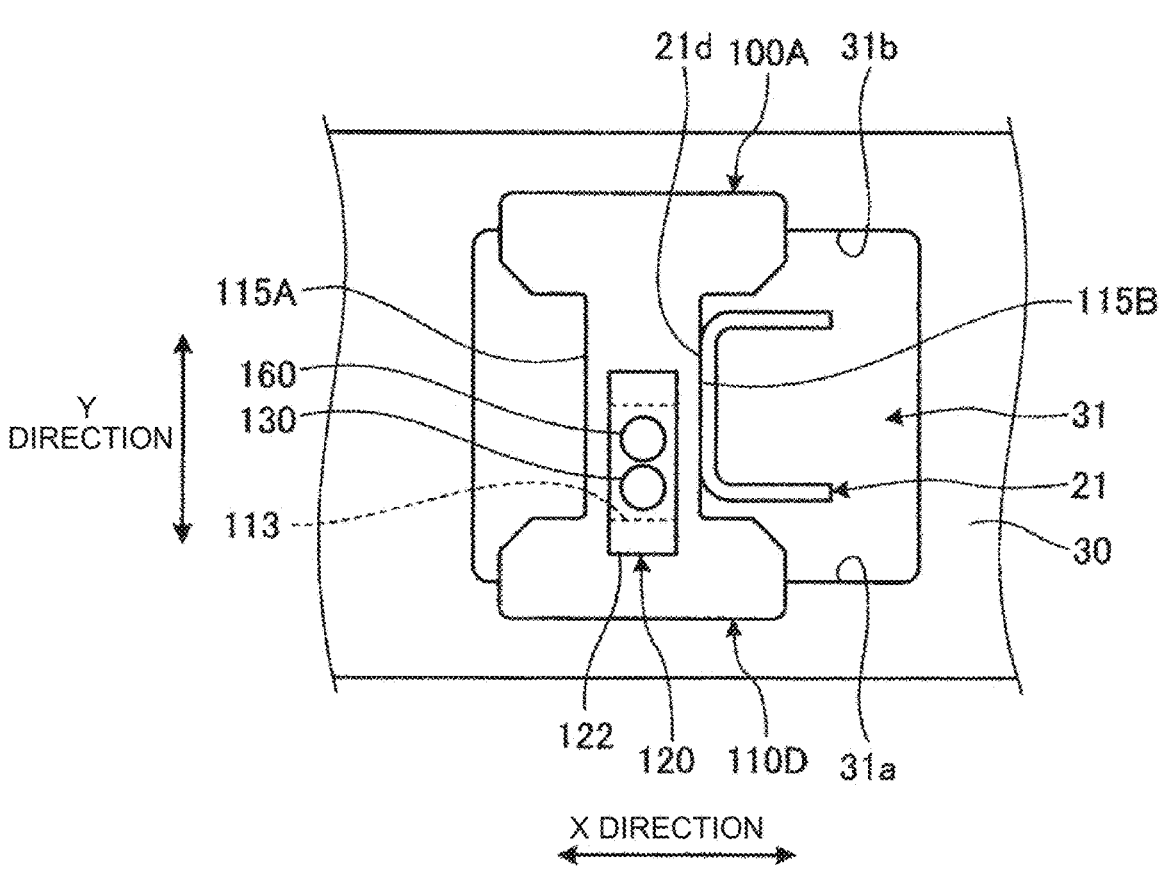
FIG. 10B schematically illustrates the first jig according to the first modification.

Next, a method of greasing using the greasing device 100 will be described with reference to FIGS. 7 to 9. FIG. 7 illustrates a state in which the first jig 110 is attached to the through hole 31 of the clutch housing 30. FIG. 8 illustrates a state in which the greasing pipe 130 extends toward the pressing portion 21*a* of the clutch release fork 21 with the second jig 120 inserted into the insertion hole of the first jig 110. FIG. 9 illustrates the height of the distal end portion 131 of the greasing pipe 130. The Z direction indicated in FIG. 9 represents the height direction. The fork boot 32 is removed before the following processes are performed. Consequently, the through hole 31 (see FIGS. 2, 9, etc.) of the clutch housing 30 for inserting the greasing pipe 130 etc. is exposed.

In a first process, the first jig 110 is fixed to the through hole 31 of the clutch housing 30 (an example of a fixation partner according to the present disclosure).

Figure 11:
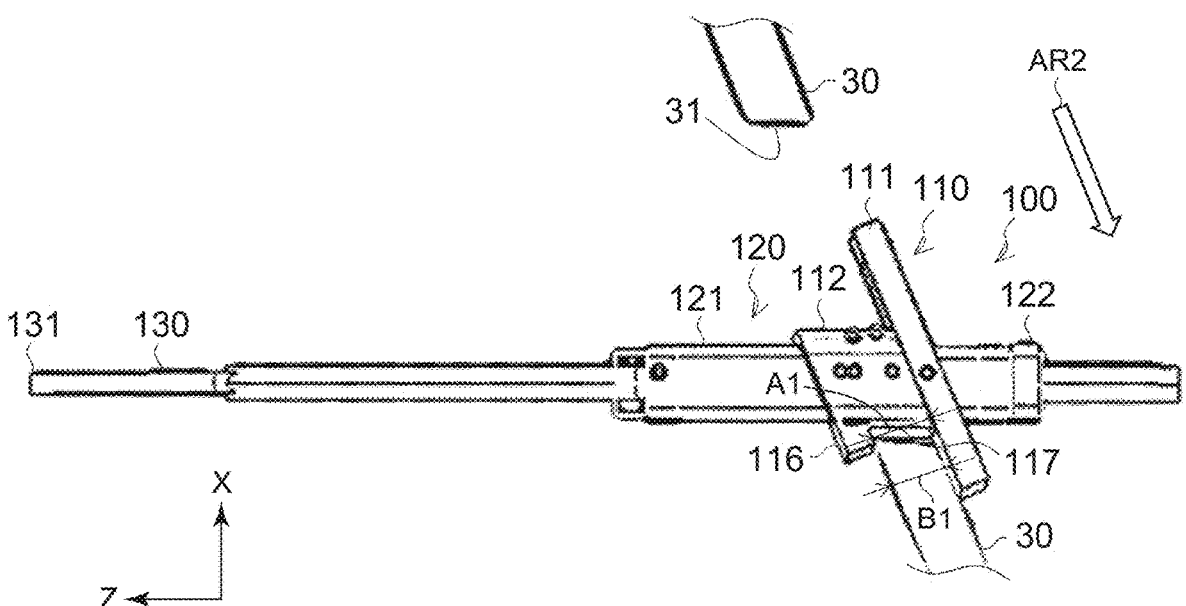
FIG. 11 illustrates a first jig 110 and a second jig 120 extracted from FIG. 9.

FIG. 11 illustrates the first jig 110 and the second jig 120 extracted from FIG. 9.

As illustrated in FIG. 11, the first jig 110 is fixed to the clutch housing 30 (a portion thereof around the through hole 31) in the state of being positioned with respect to the clutch housing 30 in the X direction, the Y direction, and the Z direction.

Specifically, first, the projecting portion 112 of the first jig 110 and the through hole 31 of the clutch housing 30 are caused to face each other (see FIG. 2), and the abutment surface 115 of the first jig 110 and the clutch release fork 21 (flat surface 21*d*) are caused to face (contact) each other (see FIG. 7).

Next, the projecting portion 112 of the first jig 110 is inserted into the through hole 31, and the first jig 110 is slid in the direction (see the arrow AR1 in FIG. 2) of moving closer to the through hole 31 along the clutch release fork 21 (flat surface 21*d*) until the base portion 111 of the first jig 110 abuts against the portion of the clutch housing 30 around the through hole 31.

The first jig 110 is positioned with respect to the clutch housing 30 in the Y direction when the projecting portion 112 of the first jig 110 is inserted into the through hole 31 and side surfaces 112*a* and 112*b* of the projecting portion 112 and inner surfaces 31*a* and 31*b* of the through hole 31 face (abut against) each other.

The first jig 110 is positioned with respect to the clutch housing 30 in the Z direction when the base portion 111 of the first jig 110 abuts against the portion of the clutch housing 30 around the through hole 31.

Next, the first jig 110 in the state of being positioned with respect to the clutch housing 30 in the Y direction and the Z direction as described above is pushed in the direction of the arrow AR2 (see FIGS. 7 and 11).

Specifically, the first jig 110 in the state of being positioned with respect to the clutch housing 30 in the Y direction and the Z direction as described above is pushed in the direction of the arrow AR2 (see FIGS. 7 and 11) until the portion of the clutch housing around the through hole 31 is inserted (press-fitted) into a space between the base portion 111 and the key portion 116 of the first jig 110 (see FIG. 11) and the portion of the clutch housing 30 around the through hole 31 abuts against a bottom portion 117 between the base portion 111 and the key portion 116 of the first jig 110.

A distance A1 (see FIG. 11) between the base portion 111 and the key portion 116 of the first jig 110 and a thickness B1 (see FIG. 11) of the portion of the clutch housing 30 around the through hole 31 are set so as to meet a relationship A1<B1. Therefore, when the first jig 110 in the state of being positioned with respect to the clutch housing 30 in the Y direction and the Z direction as described above is pushed in the direction of the arrow AR2 (see FIGS. 7 and 11), the portion of the clutch housing 30 around the through hole 31 is inserted (press-fitted) into the space between the base portion 111 and the key portion 116 of the first jig 110. Consequently, the first jig 110 is fixed to the clutch housing 30.

The first jig 110 is positioned with respect to the clutch housing 30 in the X direction when the portion of the clutch housing 30 around the through hole 31 abuts against the bottom portion 117 between the base portion 111 and the key portion 116 of the first jig 110.

The first jig 110 is fixed to the clutch housing 30 (the portion thereof around the through hole 31) in the state of being positioned with respect to the clutch housing 30 (an example of a fixation partner according to the present disclosure) in the X direction, the Y direction, and the Z direction in the manner described above. In other words, the first jig 110 is engaged with the portion of the clutch housing 30 around the through hole 31 in the state of being positioned with respect to the clutch housing 30 in the X direction, the Y direction, and the Z direction. The base portion 111 and the key portion 116 of the first jig 110 are an example of an engagement portion according to the present disclosure.

With the first jig 110 fixed to the clutch housing 30 (the portion thereof around the through hole 31) in this manner, the first hole 113 of the first jig 110 extends toward the relevant portion C (one end of the pressing portion 21*a*) (see FIG. 9). Likewise, the second hole 114 of the first jig 110 extends toward the relevant portion C (the other end of the pressing portion 21*a*). The first jig 110 can be removed from the clutch housing 30 by taking the above steps in the opposite order.

In a process (insertion process) that follows the first process, the greasing pipe 130 and the second jig 120 are inserted into the insertion hole (first hole 113, second hole 114) of the first jig 110 fixed to the clutch housing 30 as described above. In the insertion process, the second jig 120 is inserted into the insertion hole (first hole 113, second hole 114) of the first jig 110 in two stages. A scribing line to be discussed later in relation to a second embodiment is formed on side surfaces 121*a* and 121*b* of the insertion portion 121 of the second jig 120 at a position a predetermined distance from the distal end side. The insertion portion 121 is formed to have a rectangular outer peripheral shape. The side surfaces 121*a* and 121*b* correspond to the short sides of the rectangle. The side surface 121*a* is a surface on one side in the Y direction. The side surface 121*b* is a surface on the other side in the Y direction. Further, the rectangle of the insertion portion 121 is smaller than the rectangle of the opening portion of the first hole 113 and the rectangle of the opening portion of the second hole 114.

As illustrated in FIG. 8, the greasing pipe 130 extends toward the pressing portion 21*a* of the clutch release fork 21, which is the portion that needs greasing, when the insertion portion 121 of the second jig 120 is inserted into the first hole 113 of the first jig 110. The pressing portion 21a has a bifurcated structure, and the greasing pipe 130 inserted into the first hole 113 extends toward one end of the pressing portion 21a. It is occasionally necessary to avoid an obstacle inside the clutch housing 30 in order for the greasing pipe 130 to reach the vicinity of the pressing portion 21a of the clutch release fork 21. Examples of the obstacle include a clip as a constituent component of the release bearing 15. It is desirable that the clip which is provided near the bifurcated structure of the clutch release fork 21 should not contact the greasing pipe 130 before reaching the pressing portion 21a.

Thus, in a second process (the former half of the insertion process), the insertion portion 121 of the second jig 120 is inserted into the insertion hole of the first jig 110 to the position of the scribing line. The second jig 120 can be displaced in the insertion hole with respect to the first jig 110 in order to allow the greasing pipe 130 and the endoscope 160 to avoid an obstacle in the clutch housing 30 in the insertion state of the second process. That is, in a third process (avoiding operation process), the second jig 120 is moved so as to avoid the internal structure of the clutch housing 30. In the following process, a worker performs an operation of moving the second jig 120 (insertion portion 121), which is grasped with one hand (e.g. left hand), in the direction of the arrow AR3 (see FIGS. 9 and 11) toward the relevant portion C so that the distal end portion 131 of the greasing pipe 130 reaches the relevant portion C (see FIG. 9), while attentively watching a screen (an image that includes the distal end portion 131 of the greasing pipe 130 and a surrounding structure thereof (e.g. the relevant portion C)) displayed on the display portion 163 attached to the operation portion 162, which is grasped with the other hand (e.g. right hand).

In the third process, a clearance (about 0.5 mm) is provided between the side surfaces 121a and 121b of the insertion portion 121 and the inner surface (inner wall) of the first hole 113 with the insertion portion 121 inserted into the first hole 113. Similarly, a clearance (about 0.5 mm) is provided between the side surfaces 121a and 121b of the insertion portion 121 and the inner surface (inner wall) of the second hole 114 with the insertion portion 121 inserted into the second hole 114. Therefore, the greasing pipe 130 can be positioned at a height at which the greasing pipe 130 does not contact the clip of the release bearing 15 and at a position at which the internal structure such as the clip is avoided when the second jig 120 is inserted into the insertion hole to the position of the scribing line. In this case, the distal end side of the insertion portion 121 can be swung in the Y direction by holding the stopper portion 122 side with a hand.

As illustrated in FIG. 9, the clip of the release bearing 15 can be avoided when the distal end portion 131 of the greasing pipe 130 is at a height h1. In this case, the insertion of the greasing pipe 130 is stopped, and the position of the distal end portion 131 is controlled so as to avoid the clip of the release bearing 15. The height h1 also represents the amount of the insertion (stroke amount).

In the third process, for example, the second surface 113b of the first hole 113 and the side surface 121a of the insertion portion 121, which have not been in contact, are caused to contact each other, as operation for the greasing pipe 130 to avoid the obstacle in the clutch housing 30, from the state in which the first surface 113a of the first hole 113 is in abutment with the side surface 121b of the insertion portion 121. In this event, the second jig 120 is moved until the side surface 121a contacts the second surface 113b with the insertion portion 121 sliding on the third surface 113c of the first hole 113. This slide includes operation to translate the second jig 120 in the Y direction and swinging motion to swing the distal end portion 131 side to the right and the left. Consequently, the greasing pipe 130 is brought to a position at which the greasing pipe 130 does not contact the clip.

The distal end portion 131 of the greasing pipe 130 is caused to approach the portion that needs greasing again after the greasing pipe 130 is brought to a position at which the obstacle in the clutch housing 30 is avoided in this manner. That is, the process of inserting the second jig 120 is resumed, and the insertion portion 121 is inserted into the through hole 31 to a position at which the stopper portion 122 of the second jig 120 abuts against the base portion 111 of the first jig 110. The distal end portion 131 of the greasing pipe 130 has been inserted to a predetermined target position in the clutch housing 30 when the stopper portion 122 of the second jig 120 is in contact with the first jig 110. That is, in a fourth process (the latter half of the insertion process), the distal end portion 131 of the greasing pipe 130 is inserted to the portion that needs greasing by inserting the insertion portion 121 more deeply than the position of the scribing line.

In the fourth process, as illustrated in FIG. 9, the distal end portion 131 of the greasing pipe 130 reaches a height h2 at which one end of the pressing portion 21a of a bifurcated structure is positioned. The distal end portion 131 of the greasing pipe 130 can be brought to a position in the vicinity of the pressing portion 21a of the clutch release fork 21 in this manner. The amount of insertion is larger at the height h2 than at the height h1.

Then, in a fifth process, grease is supplied from the opening portion 131a of the greasing pipe 130. In the fifth process, grease is supplied to the relevant portion C (see FIG. 9) from the opening portion 131a of the greasing pipe 130 by the worker grasping the greasing unit 150 with one hand (e.g. left hand) and operating the greasing unit 150 (e.g. pushing the push rod 152 illustrated in FIG. 3 in the axial direction), while attentively watching a screen (an image that includes the distal end portion 131 of the greasing pipe 130 and a surrounding structure thereof (e.g. the relevant portion C)) displayed on the display portion 163 attached to the operation portion 162, which is grasped with the other hand (e.g. right hand). In the fifth process, when an appropriate amount of grease is supplied from the greasing unit 150 connected to the greasing pipe 130, an appropriate amount of grease is ejected from the distal end portion 131 of the greasing pipe 130 to apply the grease to the pressing portion 21a. In this case, the greasing pipe 130 has been filled in advance with grease from the greasing unit 150. Therefore, greasing can be performed smoothly by operating the greasing unit 150 once the distal end portion 131 of the greasing pipe 130 is brought to a desired position.

Then, when greasing in the fifth process is completed, the greasing pipe 130 is extracted in a sixth process. In the sixth process, grease is cut from the distal end portion 131 of the greasing pipe 130 with the first jig 110 still attached to the through hole 31. After that, as the second jig 120 is extracted from the through hole 31, the distal end portion 131 of the greasing pipe 130 is also extracted from the through hole 31 to the outside of the clutch housing 30.

For example, the second jig 120 is extracted from the insertion hole of the first jig 110. The clearance between the insertion hole and the insertion portion 121 enables the second jig 120 to be swung to the right and the left when the second jig 120 is extracted from the insertion hole of the first jig 110. Consequently, adhesion of grease to portions and components other than the portion that needs greasing can be avoided.

When the first to fifth processes discussed above are performed for the first hole 113, the second to fifth processes are performed for the second hole 114 with the first jig 110 kept in the attached state. Consequently, greasing can be performed for both ends of the pressing portion 21*a* of a bifurcated structure.

The second process and the third process discussed above may be omitted when there is no obstacle inside the clutch housing 30 before reaching the portion that needs greasing. In this case, the scribing line on the second jig 120 is not necessary, and the insertion portion 121 of the second jig 120 may be inserted into the insertion hole of the first jig 110 continuously until the stopper portion 122 abuts against the first jig 110 by performing the fourth process after the first process.

With the greasing device 100 according to the first embodiment, as has been described above, it is possible to grease the pressing portion 21*a* of the clutch release fork 21 without removing the clutch housing 30 (or a manual transmission unit that includes the clutch housing 30) from the vehicle. Consequently, the work of greasing maintenance is facilitated to improve workability.

Figure 12A:
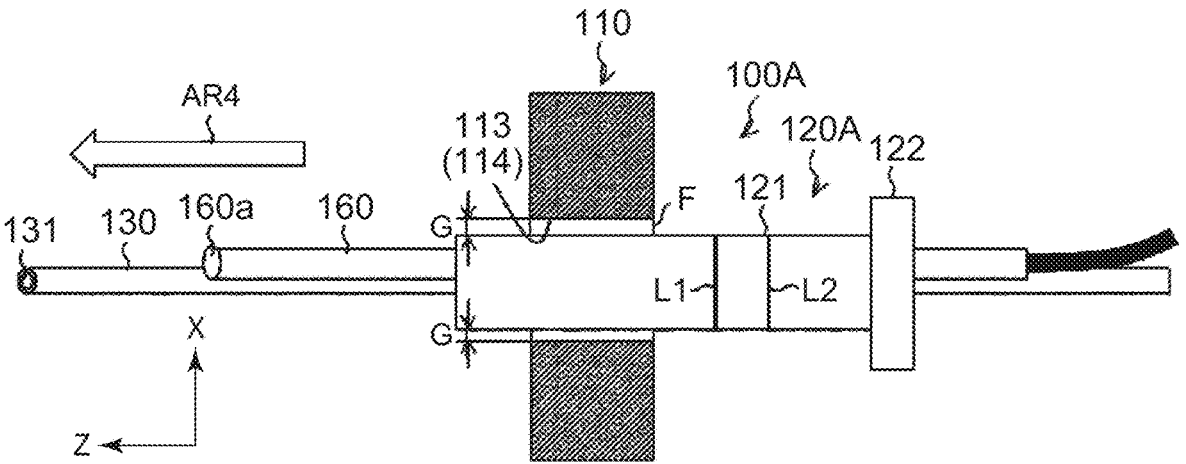
FIG. 12A is a schematic view of an insertion amount grasping device according to a second embodiment of the present disclosure.
Figure 12B:
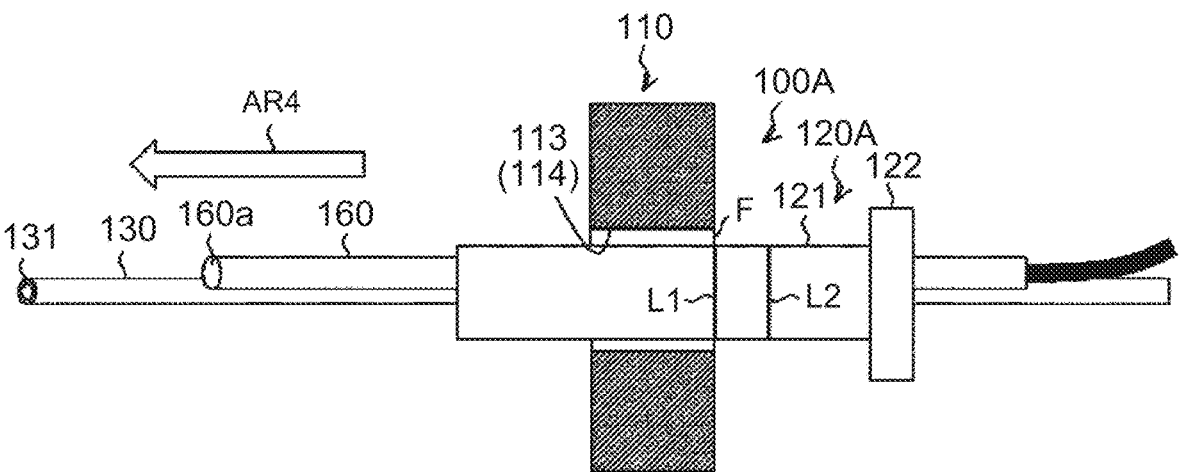
FIG. 12B is a schematic view of the insertion amount grasping device according to the second embodiment of the present disclosure.
Figure 12C:
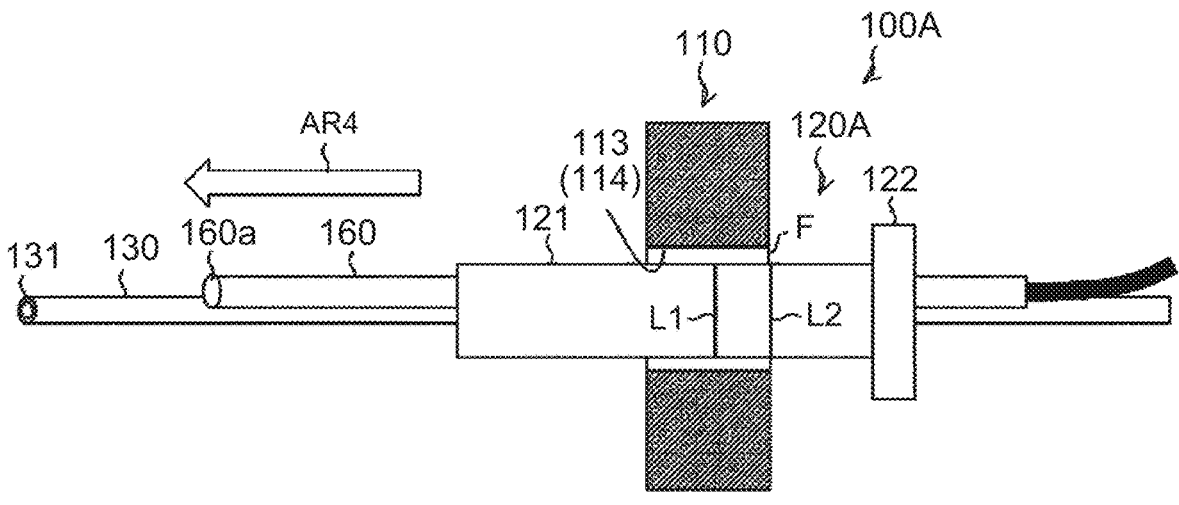
FIG. 12C is a schematic view of the insertion amount grasping device according to the second embodiment of the present disclosure.

Next, an insertion amount grasping device 100A according to a second embodiment will be described. FIGS. 12A to 12C are each a schematic view of the insertion amount grasping device according to the second embodiment. FIGS. 12A to 12C illustrate how the second jig 120 is inserted into the first jig 110 sequentially in this order.

The insertion amount grasping device 100A is a device that allows visually grasping a necessary amount (hereinafter also referred to as a "necessary insertion amount") of insertion of the second jig 120 into the first jig 110 for the distal end portion 131 of the greasing pipe 130 to reach a position P1 (see FIG. 9) which is in the vicinity of the relevant portion C, or a position P2 (see FIG. 9) which is a predetermined distance before the relevant portion C, from the outside of the clutch housing 30.

The insertion amount grasping device 100A is configured similarly to the greasing device 100 according to the first embodiment, but is different from the greasing device 100 according to the first embodiment in that a first scribing line L1 and a second scribing line L2 are formed on the insertion portion 121 of the second jig 120.

The differences from the first embodiment will be mainly described below, and components that are identical to those according to the first embodiment are given like signs to omit description thereof as appropriate. In the following description, as described above in relation to the first embodiment, it is assumed that the first jig 110 is fixed to the clutch housing 30 (a portion thereof around the through hole 31) in the state of being positioned with respect to the clutch housing 30 in the X direction, the Y direction, and the Z direction.

The first jig 110 and the second jig 120 may be made of a resin, or may be made of metal.

As illustrated in FIG. 12A, the insertion portion 121 of the second jig 120 is inserted into the first hole 113 (or the second hole 114) formed in the first jig 110, and moved in the direction of the arrow AR4 toward the relevant portion C (see FIG. 9) while being grasped by the worker. The distal end portion 131 of the greasing pipe 130 reaches the position P2 (see FIG. 9) which is a predetermined distance before the relevant portion C, and the position P1 (see FIG. 9) which is in the vicinity of the relevant portion C, along with an operation to move the second jig 120 toward the relevant portion C.

The first scribing line L1 and the second scribing line L2 are formed on the insertion portion 121 of the second jig 120, as illustrated in FIG. 12A, in order to allow visually grasping a necessary amount of insertion of the second jig 120 into the first jig 110 for the distal end portion 131 of the greasing pipe 130 to reach the position P2 (see FIG. 9) which is a predetermined distance before the relevant portion C and the position P1 (see FIG. 9) which is in the vicinity of the relevant portion C in this manner. Marks such as lines drawn using a marker pen or a sticker may be formed on the insertion portion 121 of the second jig 120 in place of the scribing lines L1 and L2.

The first scribing line L1 is positioned so as to reach the first jig 110 (e.g. a guide flange F provided on the first jig 110) (e.g. overlap the guide flange F) (see FIG. 12B) when the distal end portion 131 of the greasing pipe 130 reaches the position P2 (see FIG. 9) which is a predetermined distance before the relevant portion C (when the distal end portion 131 of the greasing pipe 130 and the relevant portion C have established a predetermined position relationship).

Thus, the worker can grasp a necessary amount of insertion of the second jig 120 into the first jig 110 for the distal end portion 131 of the greasing pipe 130 to reach the position P2 (see FIG. 9) which is a predetermined distance before the relevant portion C, by visually checking the position relationship between the first scribing line L1 and the first jig 110 (e.g. the guide flange F provided on the first jig 110) from the outside of the clutch housing 30.

The second scribing line L2 is positioned so as to reach the first jig 110 (e.g. the guide flange F provided on the first jig 110) (e.g. overlap the guide flange F) (see FIG. 12C) when the distal end portion 131 of the greasing pipe 130 reaches the position P1 (see FIG. 9) which is in the vicinity of the relevant portion C (when the distal end portion 131 of the greasing pipe 130 and the relevant portion C have established a predetermined position relationship).

Thus, the worker can grasp a necessary amount of insertion of the second jig 120 into the first jig 110 for the distal end portion 131 of the greasing pipe 130 to reach the position P1 (see FIG. 9) which is in the vicinity of the relevant portion C, by visually checking the position relationship between the second scribing line L2 and the first jig 110 (e.g. the guide flange F provided on the first jig 110) from the outside of the clutch housing 30. The scribing line L1 may be omitted.

With the second embodiment, as has been described above, it is possible to allow visually grasping a necessary amount of insertion of the second jig 120 into the first jig 110 for the distal end portion 131 of the greasing pipe 130 to reach the position P1 (see FIG. 9) which is in the vicinity of the relevant portion C, or the position P2 (see FIG. 9) which is a predetermined distance before the relevant portion C, from the outside of the clutch housing 30.

The second embodiment has the following advantage. That is, a necessary amount of insertion (stroke) for the distal end portion 131 of the greasing pipe 130 to reach the vicinity of the relevant portion C is occasionally different among vehicle models (among manual transmission units). In such cases, a mark (e.g. a scribing line or a line drawn using a maker pen or a sticker) that reaches the first jig 110 (e.g. the guide flange F provided on the first jig 110) when the distal end portion 131 of the greasing pipe 130 reaches the vicinity of the relevant portion C has been formed on the insertion portion 121 of the second jig 120 for each of vehicle models (manual transmission units) with different necessary insertion amounts. Consequently, greasing can be performed using a single first jig 110 for a plurality of vehicle models (a plurality of manual transmission units) with different necessary insertion amounts. That is, it is not necessary to prepare the first jig 110 for each of vehicle models (manual transmission units), which can suppress an increase in the number of types of the first jig 110 and accordingly an increase in the amount of investment (cost).

Figure 13A:
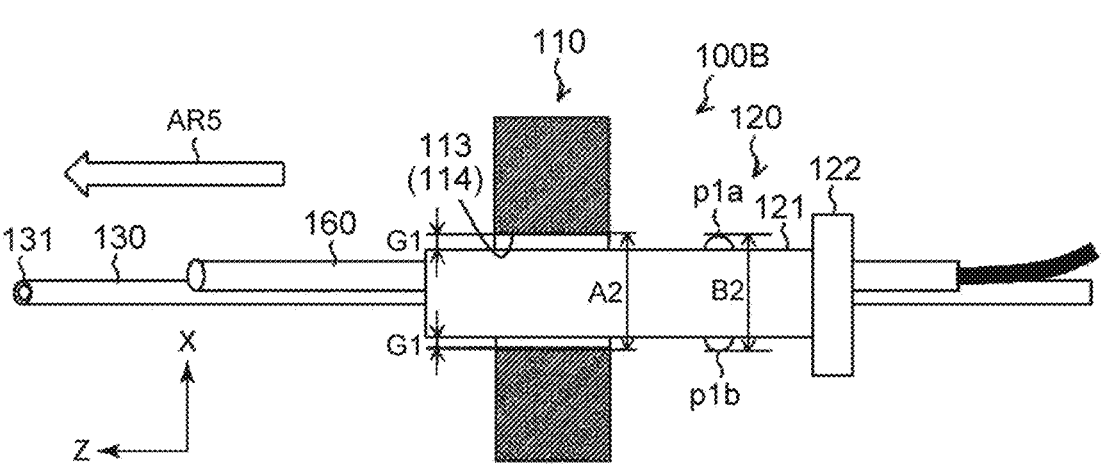
FIG. 13A is a schematic view of an insertion amount grasping device according to a third embodiment of the present disclosure.
Figure 13B:
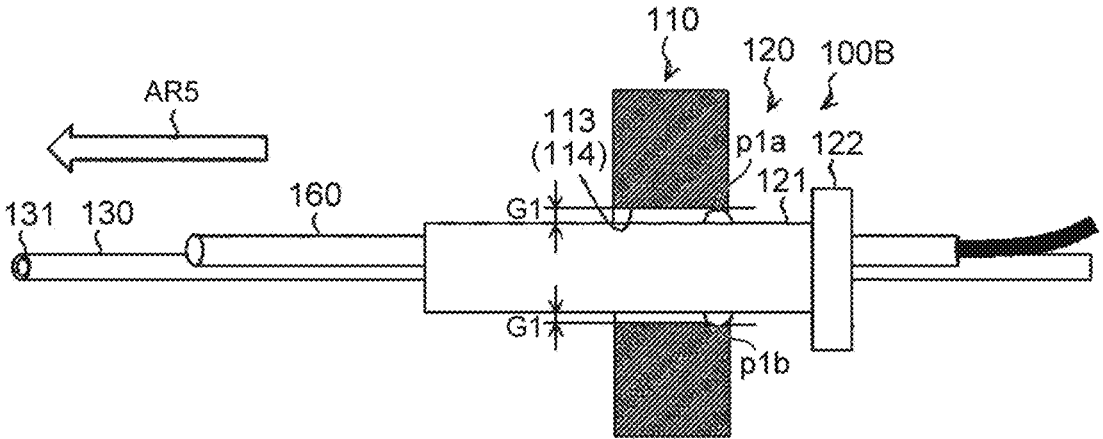
FIG. 13B is a schematic view of the insertion amount grasping device according to the third embodiment.

Next, an insertion amount grasping device 100B according to a third embodiment will be described. FIGS. 13A and 13B are each a schematic view of the insertion amount grasping device according to the third embodiment. FIGS. 13A and 13B illustrate how the second jig 120 is inserted into the first jig 110 sequentially in this order.

The insertion amount grasping device 100B is a device that allows grasping the distal end portion 131 of the greasing pipe 130 having reached the position P1 (see FIG. 9) which is in the vicinity of the relevant portion C (the distal end portion 131 of the greasing pipe 130 and the relevant portion C having established a predetermined position relationship) through hand feeling (sensation of a hand that grasps the second jig 120), rather than visually.

The insertion amount grasping device 100B is configured similarly to the greasing device 100 according to the first embodiment, but is different from the greasing device 100 according to the first embodiment in that the insertion portion 121 of the second jig 120 is provided with first protruding portions p1a and p1b.

The differences from the first embodiment will be mainly described below, and components that are identical to those according to the first embodiment are given like signs to omit description thereof as appropriate. In the following description, as described above in relation to the first embodiment, it is assumed that the first jig 110 is fixed to the clutch housing 30 (a portion thereof around the through hole 31) in the state of being positioned with respect to the clutch housing 30 in the X direction, the Y direction, and the Z direction.

At least one of the first jig 110 and the second jig 120 is made of a resin. When one of the jigs is made of a resin, the other may be made of a resin, or may be made of metal.

As illustrated in FIG. 13A, the insertion portion 121 of the second jig 120 is inserted into the first hole 113 (or the second hole 114) formed in the first jig 110, and moved in the direction of the arrow AR5 toward the relevant portion C (see FIG. 9) while being grasped by the worker. The distal end portion 131 of the greasing pipe 130 reaches the position P1 (see FIG. 9) which is in the vicinity of the relevant portion C along with an operation to move the second jig 120 toward the relevant portion C.

The insertion portion 121 of the second jig 120 is provided with the first protruding portions p1a and p1b, in order to allow grasping the distal end portion 131 of the greasing pipe 130 having reached the position P1 (see FIG. 9) which is in the vicinity of the relevant portion C (the distal end portion 131 of the greasing pipe 130 and the relevant portion C having established a predetermined position relationship) in this manner through hand feeling (sensation of a hand that grasps the second jig 120), rather than visually.

The first protruding portions p1a and p1b are hemispherical protruding portions, for example. The first protruding portions p1a and p1b are not limited to hemispherical protruding portions, and may be protruding portions in other shapes.

The first protruding portions p1a and p1b are positioned to be inserted into the first hole 113 (or the second hole 114)

(see FIG. 13B) to cause friction (friction force) with the first hole 113 (or the second hole 114) when the distal end portion 131 of the greasing pipe 130 has reached the position P1 (see FIG. 9) which is in the vicinity of the relevant portion C along with an operation to move the second jig 120 toward the relevant portion C.

In order to cause such friction, a diameter A2 (design dimension) of the first hole 113 (and the second hole 114) and a thickness B2 (design dimension) of the insertion portion 121 of the second jig 120, including the first protruding portions p1a and p1b, are set to meet a relationship A2<B2 as illustrated in FIG. 13A.

Thus, the worker can grasp the distal end portion 131 of the greasing pipe 130 having reached the position P1 (see FIG. 9) which is in the vicinity of the relevant portion C (the above friction) along with an operation to move the second jig 120 toward the relevant portion C through hand feeling (sensation of a hand that grasps the second jig 120), rather than visually.

With the third embodiment, as has been described above, it is possible to grasp the distal end portion 131 of the greasing pipe 130 having reached the position P1 (see FIG. 9) which is in the vicinity of the relevant portion C (the distal end portion 131 of the greasing pipe 130 and the relevant portion C having established a predetermined position relationship) through hand feeling (sensation of a hand that grasps the second jig 120), rather than visually.

This is because of the presence of the first protruding portions p1a and p1b to be inserted into the first hole 113 (or the second hole 114) (see FIG. 13B) to cause friction (friction force) with the first hole 113 (or the second hole 114) when the distal end portion 131 of the greasing pipe 130 has reached the position P1 (see FIG. 9) which is in the vicinity of the relevant portion C (when the distal end portion 131 of the greasing pipe 130 and the relevant portion C have established a predetermined position relationship) along with an operation to move the second jig 120 toward the relevant portion C.

Therefore, the worker can concentrate on the operation to move the second jig 120 (insertion portion 121), which is grasped with one hand (e.g. left hand), in the direction of the arrow AR5 toward the relevant portion C so that the distal end portion 131 of the greasing pipe 130 reaches the position P1 (see FIG. 9) which is in the vicinity of the relevant portion C, while attentively watching a screen (an image that includes the distal end portion 131 of the greasing pipe 130 and a surrounding structure thereof (e.g. the relevant portion C)) displayed on the display portion 163 attached to the operation portion 162, which is grasped by the other hand (e.g. right hand).

The third embodiment has the following advantage. That is, as described above, the second jig 120 is fixed to the first jig 110 by friction caused between the first protruding portions p1a and p1b and the inner wall of the first hole 113 (or the second hole 114) when the first protruding portions p1a and p1b are inserted into the first hole 113 (or the second hole 114). The gap (clearance) between the insertion portion 121 of the second jig 120 inserted into the first hole 113 (or the second hole 114) and the inner wall of the first hole 113 (or the second hole 114) is about 0.5 mm.

Therefore, the position of the distal end portion 131 of the greasing pipe 130 is not varied (is hardly varied) with respect to the relevant portion C, even if the worker releases the second jig 120 from his/her hand, when the above friction is caused.

Therefore, grease can be supplied to the relevant portion C from the opening portion 131a of the greasing pipe 130 when the above friction is caused, that is, when the distal end portion 131 of the greasing pipe 130 has reached the position P1 (see FIG. 9) which is in the vicinity of the relevant portion C, by releasing the second jig 120 from the one hand (e.g. left hand) and newly grasping and operating the greasing unit 150 (e.g. pushing the push rod 152 illustrated in FIG. 3 in the axial direction) with the other, vacant hand (e.g. the left hand). That is, a single worker can perform an operation to move the second jig 120 toward the relevant portion C, and subsequently an operation to supply grease to the relevant portion C from the opening portion 131a of the greasing pipe 130. This improves work efficiency.

Figure 14A:
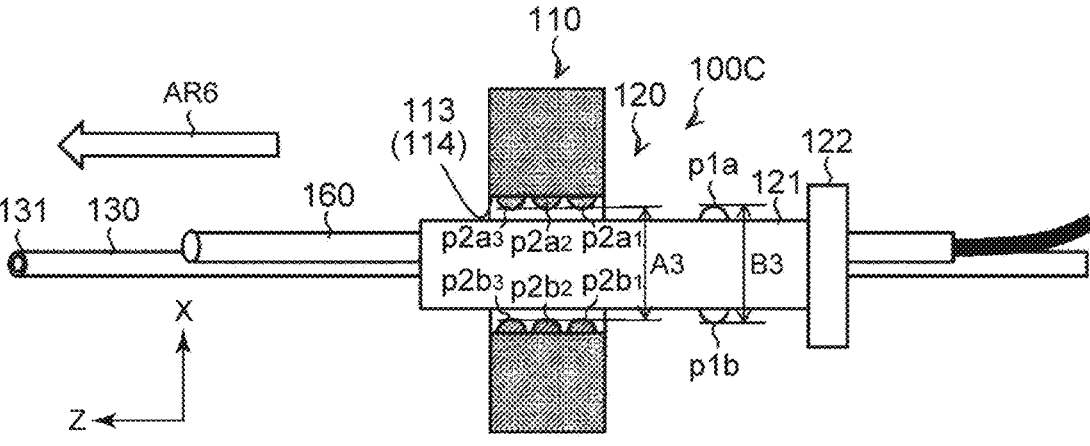
FIG. 14A is a schematic view of an insertion amount grasping device according to a fourth embodiment of the present disclosure.
Figures 14B, 14C, 15:
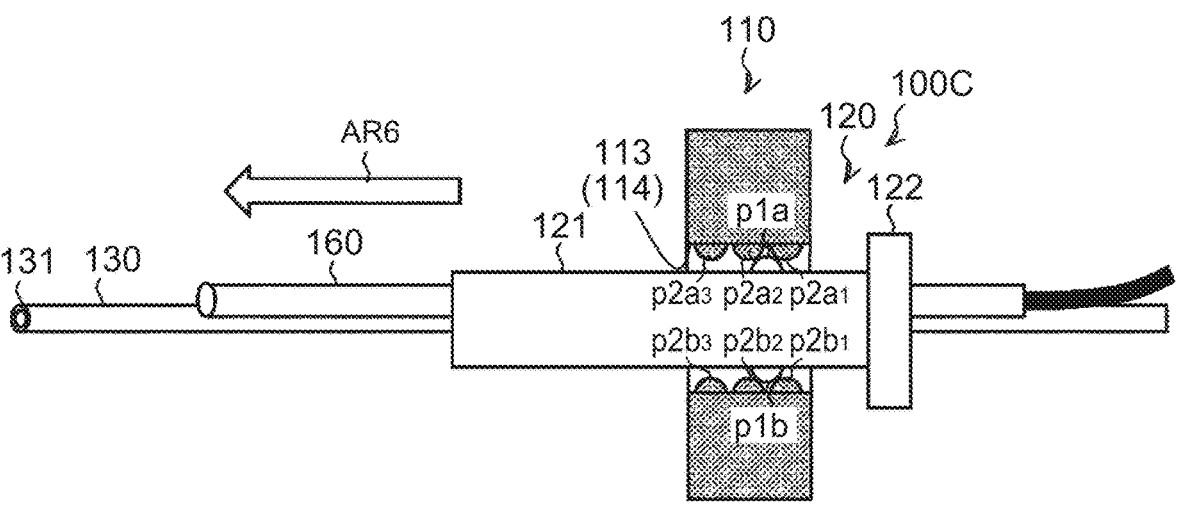
FIG. 14B is a schematic view of the insertion amount grasping device according to the fourth embodiment.
FIG. 14C is a schematic view of the insertion amount grasping device according to the fourth embodiment.
FIG. 15 is a schematic view of an insertion amount grasping device according to (a modification of) the fourth embodiment.

Next, an insertion amount grasping device 100C according to a fourth embodiment will be described. FIGS. 14A to 14C are each a schematic view of the insertion amount grasping device according to the fourth embodiment. FIGS. 14A to 14C illustrate how the second jig 120 is inserted into the first jig 110 sequentially in this order.

The insertion amount grasping device 100C is a device that allows grasping the distal end portion 131 of the greasing pipe 130 having reached the position P2 (see FIG. 9) which is a predetermined distance before the relevant portion C or the position P1 (see FIG. 9) which is in the vicinity of the relevant portion C (the distal end portion 131 of the greasing pipe 130 and the relevant portion C having established a predetermined position relationship) through hand feeling (sensation of a hand that grasps the second jig 120), rather than visually.

The insertion amount grasping device 100C is configured similarly to the greasing device 100 according to the first embodiment, but is different from the greasing device 100 according to the first embodiment in that the insertion portion 121 of the second jig 120 is provided with first protruding portions p1a and p1b and that the inner wall of the first hole 113 (and the second hole 114) formed in the first jig 110 is provided with second protruding portions p2a (p2a1, p2a2, p2a3) and p2b (p2b1, p2b2, p2b3).

The differences from the first embodiment will be mainly described below, and components that are identical to those according to the first embodiment are given like signs to omit description thereof as appropriate. In the following description, as described above in relation to the first embodiment, it is assumed that the first jig 110 is fixed to the clutch housing 30 (a portion thereof around the through hole 31) in the state of being positioned with respect to the clutch housing 30 in the X direction, the Y direction, and the Z direction.

At least one of the first jig 110 and the second jig 120 is made of a resin. When one of the jigs is made of a resin, the other may be made of a resin, or may be made of metal.

As illustrated in FIG. 14A, the insertion portion 121 of the second jig 120 is inserted into the first hole 113 (or the second hole 114) formed in the first jig 110, and moved in the direction of the arrow AR6 toward the relevant portion C (see FIG. 9) while being grasped by the worker. The distal end portion 131 of the greasing pipe 130 reaches the position P2 (see FIG. 9) which is a predetermined distance before the relevant portion C, and the position P1 (see FIG. 9) which is in the vicinity of the relevant portion C, along with an operation to move the second jig 120 toward the relevant portion C.

The insertion portion 121 of the second jig 120 is provided with the first protruding portions p1a and p1b, in order to allow grasping the distal end portion 131 of the greasing pipe 130 having reached the position P2 (see FIG. 9) which is a predetermined distance before the relevant portion C or the position P1 (see FIG. 9) which is in the vicinity of the relevant portion C (the distal end portion 131 of the greasing pipe 130 and the relevant portion C having established a predetermined position relationship) in this manner through hand feeling (sensation of a hand that grasps the second jig 120), rather than visually. In addition, the inner wall of the first hole 113 (and the second hole 114) formed in the first jig 110 is provided with the second protruding portions p2a (p2a1, p2a2, p2a3) and p2b (p2b1, p2b2, p2b3).

The first protruding portions p1a and p1b and the second protruding portions p2a (p2a1, p2a2, p2a3) and p2b (p2b1, p2b2, p2b3) are hemispherical protruding portions, for example. The first protruding portions p1a and p1b and the second protruding portions p2a (p2a1, p2a2, p2a3) and p2b (p2b1, p2b2, p2b3) are not limited to hemispherical protruding portions, and may be protruding portions in other shapes.

The first protruding portions p1a and p1b are positioned so as to be inserted into the first hole 113 (or the second hole 114) when the distal end portion 131 of the greasing pipe 130 has reached the position P2 (see FIG. 9) which is a predetermined distance before the relevant portion C, or the position P1 (see FIG. 9) which is in the vicinity of the relevant portion C, along with an operation to move the second jig 120 toward the relevant portion C (see FIGS. 14B and 14C).

The second protruding portions p2a (p2a1, p2a2, p2a3) and p2b (p2b1, p2b2, p2b3) are disposed in line along the direction of insertion of the second jig 120 (see the arrow AR6 in FIG. 14).

The first protruding portions p1a and p1b pass through the second protruding portions p2a (p2a1, p2a2, p2a3) and p2b (p2b1, p2b2, p2b3) while causing friction with the second protruding portions p2a (p2a1, p2a2, p2a3) and p2b (p2b1, p2b2, p2b3) along with an operation to move the second jig 120 toward the relevant portion C.

In order to cause such friction, a diameter A3 (design dimension) of the first hole 113 (and the second hole 114), including the second protruding portions p2a (p2a1, p2a2, p2a3) and p2b (p2b1, p2b2, p2b3), and a thickness B3 (design dimension) of the insertion portion 121 of the second jig 120, including the first protruding portions p1a and p1b, are set to meet a relationship A3<B3 as illustrated in FIG. 14A.

Thus, the worker can grasp the distal end portion 131 of the greasing pipe 130 having reached the position P2 (see FIG. 9) which is a predetermined distance before the relevant portion C or the position P1 (see FIG. 9) which is in the vicinity of the relevant portion C (the above friction) along with an operation to move the second jig 120 toward the relevant portion C through hand feeling (sensation of a hand that grasps the second jig 120), rather than visually. For example, the worker can grasp the distal end portion 131 of the greasing pipe 130 having reached the position P2 (see FIG. 9) which is a predetermined distance before the relevant portion C (the above friction) through hand feeling (sensation of a hand that grasps the second jig 120), rather than visually, when the first protruding portions p1a and p1b have passed through the second protruding portions p2a1 and p2b1 while abutting against (or press-contacting) the second protruding portions p2a1 and p2b1 along with an operation to move the second jig 120 toward the relevant portion C. In addition, the worker can grasp the distal end portion 131 of the greasing pipe 130 having reached the position P1 (see FIG. 9) which is in the vicinity of the relevant portion C (the above friction) through hand feeling (sensation of a hand that grasps the second jig 120), rather than visually, when the first protruding portions p1a and p1b have passed through the second protruding portions p2*a*2 and p2*b*2 while abutting against (or press-contacting) the second protruding portions p2*a*2 and p2*b*2 along with an operation to further move the second jig 120 toward the relevant portion C.

With the fourth embodiment, as has been described above, it is possible to grasp the distal end portion 131 of the greasing pipe 130 having reached having reached the position P2 (see FIG. 9) which is a predetermined distance before the relevant portion C or the position P1 (see FIG. 9) which is in the vicinity of the relevant portion C (the distal end portion 131 of the greasing pipe 130 and the relevant portion C having established a predetermined position relationship) through hand feeling (sensation of a hand that grasps the second jig 120), rather than visually.

This is because of the presence of the first protruding portions p1*a* and p1*b* and the second protruding portions p2*a* (p2*a*1, p2*a*2, p2*a*3) and p2*b* (p2*b*1, p2*b*2, p2*b*3) which cause friction (friction force) when the distal end portion 131 of the greasing pipe 130 has reached the position P2 (see FIG. 9) which is a predetermined distance before the relevant portion C or the position P1 (see FIG. 9) which is in the vicinity of the relevant portion C (when the distal end portion 131 of the greasing pipe 130 and the relevant portion C have established a predetermined position relationship) along with an operation to move the second jig 120 toward the relevant portion C.

Therefore, the worker can concentrate on the operation to move the second jig 120 (insertion portion 121), which is grasped with one hand (e.g. left hand), in the direction of the arrow AR6 toward the relevant portion C so that the distal end portion 131 of the greasing pipe 130 reaches the position P2 (see FIG. 9) which is a predetermined distance before the relevant portion C, or the position P1 (see FIG. 9) which is in the vicinity of the relevant portion C, while attentively watching a screen (an image that includes the distal end portion 131 of the greasing pipe 130 and a surrounding structure thereof (e.g. the relevant portion C)) displayed on the display portion 163 attached to the operation portion 162, which is grasped by the other hand (e.g. right hand).

The fourth embodiment has the following advantage. That is, as described above, the second jig 120 is fixed to the first jig 110 when the distal end portion 131 of the greasing pipe 130 reaches the position P1 (see FIG. 9) which is in the vicinity of the relevant portion C and the first protruding portions p1*a* and p1*b* are inserted into the first hole 113 (or the second hole 114) (see FIG. 14C). The gap (clearance) between the insertion portion 121 of the second jig 120 inserted into the first hole 113 (or the second hole 114) and the inner wall of the first hole 113 (or the second hole 114) is about 0.5 mm.

Therefore, the position of the distal end portion 131 of the greasing pipe 130 is not varied (is hardly varied) with respect to the relevant portion C, even if the worker releases the second jig 120 from his/her hand, when the distal end portion 131 of the greasing pipe 130 reaches the position P1 (see FIG. 9) which is in the vicinity of the relevant portion C and the first protruding portions p1*a* and p1*b* are inserted into the first hole 113 (or the second hole 114) (see FIG. 14C).

Therefore, grease can be supplied to the relevant portion C from the opening portion 131*a* of the greasing pipe 130 when the distal end portion 131 of the greasing pipe 130 has reached the position P1 (see FIG. 9) which is in the vicinity of the relevant portion C, by releasing the second jig 120 from the one hand (e.g. left hand) and newly grasping and operating the greasing unit 150 (e.g. pushing the push rod

152 illustrated in FIG. 3 in the axial direction) with the vacant one hand (e.g. the left hand). That is, a single worker can perform an operation to move the second jig 120 toward the relevant portion C, and subsequently an operation to supply grease to the relevant portion C from the opening portion 131*a* of the greasing pipe 130. This improves work efficiency.

The fourth embodiment also has the following advantage. That is, a necessary amount of insertion (stroke) for the distal end portion 131 of the greasing pipe 130 to reach the vicinity of the relevant portion C is occasionally different among vehicle models (among manual transmission units). In this case, the second protruding portions p2*a* (p2*a*1, p2*a*2, p2*a*3) and p2*b* (p2*b*1, p2*b*2, p2*b*3) are disposed so as to cause friction (friction force) when the distal end portion 131 of the greasing pipe 130 reaches the vicinity of the relevant portion C for each of vehicle models (manual transmission units) with different necessary insertion amounts. Consequently, greasing can be performed using a single first jig 110 for a plurality of vehicle models (a plurality of manual transmission units) with different necessary insertion amounts. That is, it is not necessary to prepare the first jig 110 for each of vehicle models (manual transmission units), which can suppress an increase in the number of types of the first jig 110 and accordingly an increase in the amount of investment (cost).

Modifications will be described next.

FIG. 15 is a schematic view of an insertion amount grasping device according to (a modification of) the fourth embodiment.

While the insertion portion 121 of the second jig 120 is provided with the first protruding portions p1*a* and p1*b* and the inner wall of the first hole 113 (and the second hole 114) formed in the first jig 110 is provided with the second protruding portions p2*a* (p2*a*1, p2*a*2, p2*a*3) and p2*b* (p2*b*1, p2*b*2, p2*b*3) as illustrated in FIG. 14A in the fourth embodiment, this is not limiting.

Conversely, the insertion portion 121 of the second jig 120 may be provided with the second protruding portions p2*a* (p2*a*1, p2*a*2, p2*a*3) and p2*b* (p2*b*1, p2*b*2, p2*b*3) and the inner wall of the first hole 113 (and the second hole 114) formed in the first jig 110 may be provided with the first protruding portions p1*a* and p1*b* as illustrated in FIG. 15, for example.

While three second protruding portions p2*a* (p2*a*1, p2*a*2, p2*a*3) and p2*b* (p2*b*1, p2*b*2, p2*b*3) are provided on each side in the fourth embodiment, this is not limiting. For example, four or more second protruding portions p2*a* and p2*b* may be provided on each side.

Figures 16, 17:
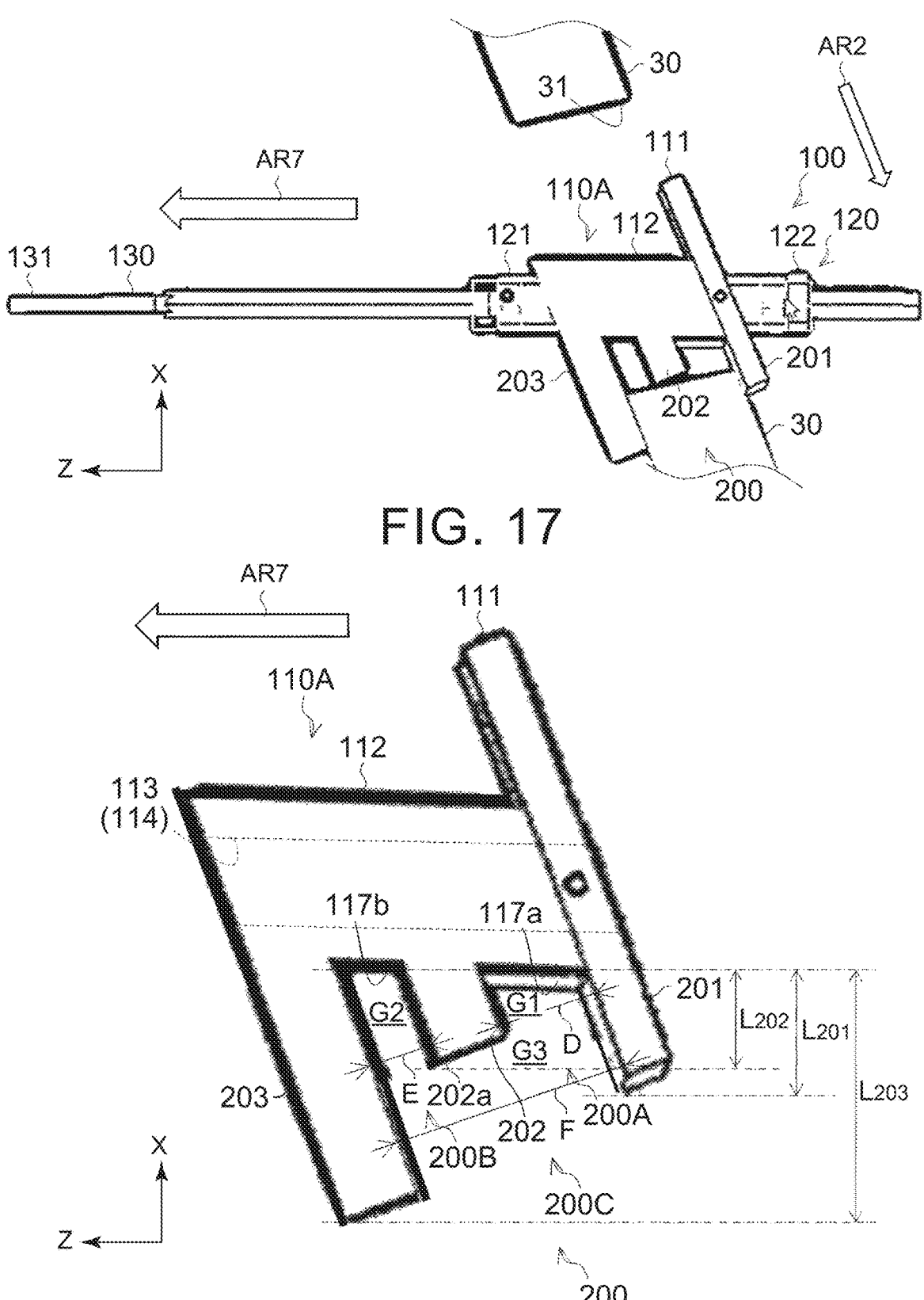
FIG. 16 is a side view of a guide jig into which the second jig is inserted.
FIG. 17 illustrates the guide jig extracted from FIG. 16.

Next, a guide jig 110A according to a fifth embodiment will be described. FIG. 16 is a side view of the guide jig 110A into which the second jig 120 is inserted. FIG. 17 illustrates the guide jig 110A extracted from FIG. 16.

The guide jig 110A is configured similarly to the first jig 110 according to the first embodiment, but is different from the first jig 110 according to the first embodiment in including an engagement portion 200 to be engaged with a plurality of engagement partners with different thicknesses.

The differences from the first jig 110 will be mainly described below, and components that are identical to those of the first jig 110 are given like signs to omit description thereof as appropriate.

At least one of the guide jig 110A and the second jig 120 is made of a resin. When one of the jigs is made of a resin, the other may be made of a resin, or may be made of metal.

Figure 18A:
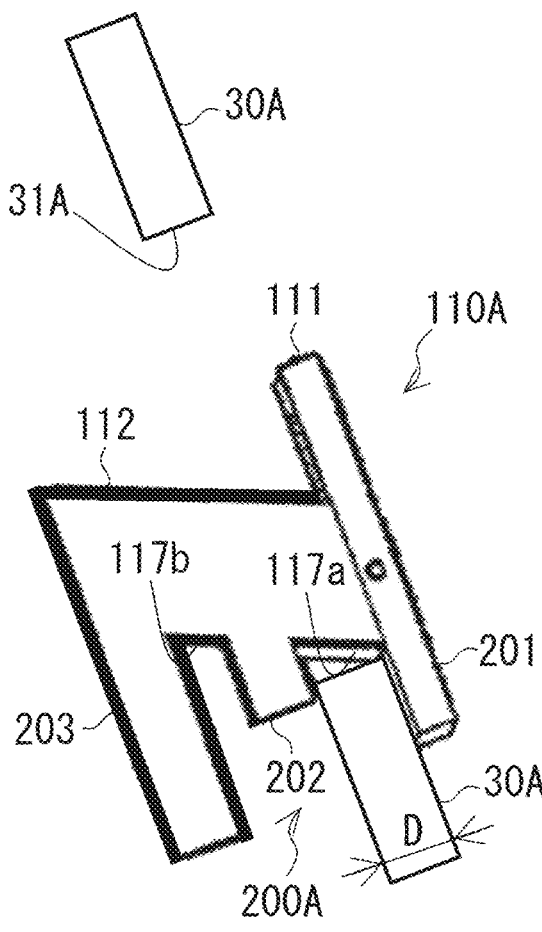
FIG. 18A illustrates how the guide jig is engaged with a plurality of engagement partners with different thicknesses.
Figure 18B:
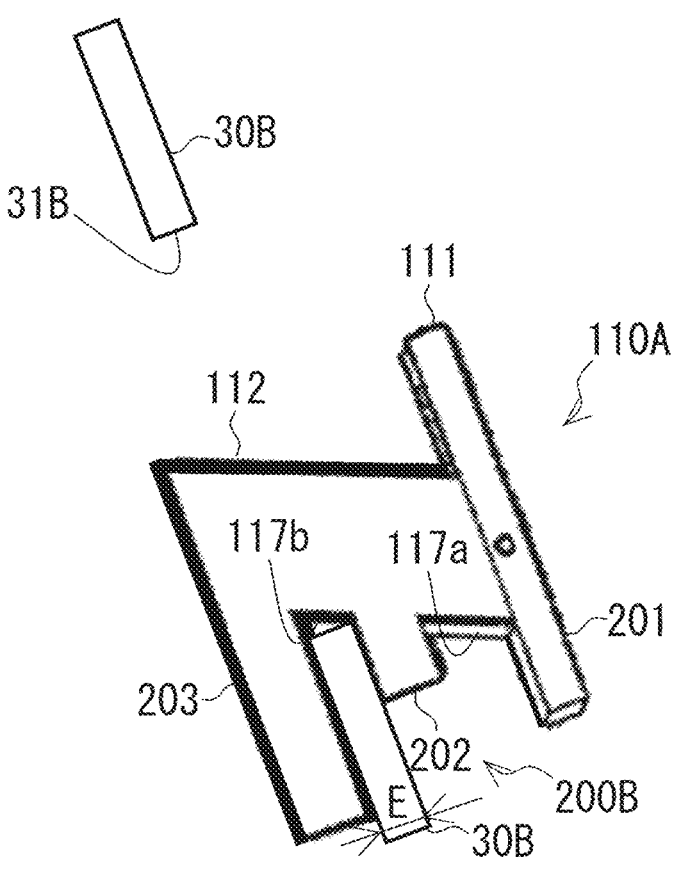
FIG. 18B illustrates how the guide jig is engaged with the engagement partners with different thicknesses.
Figure 18C:
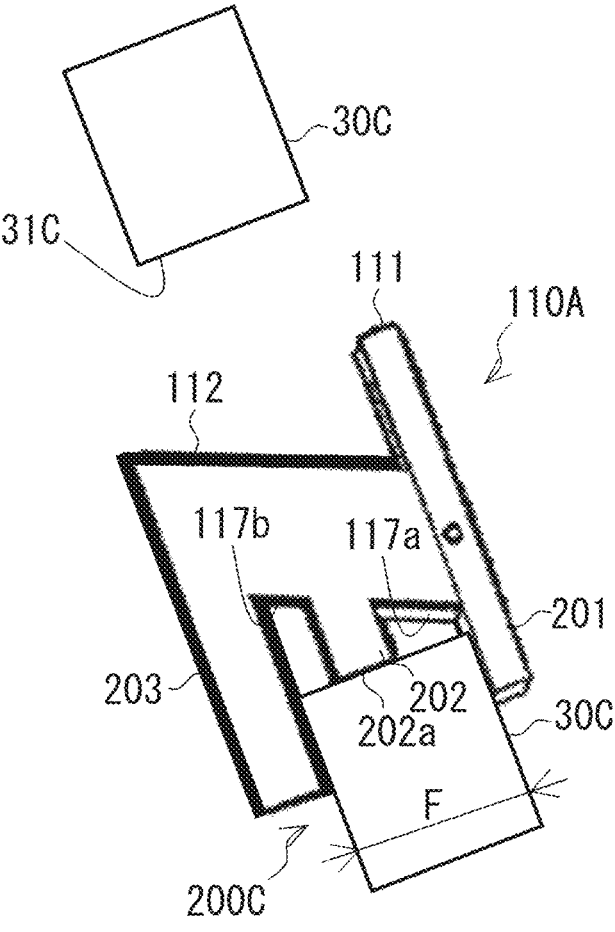
FIG. 18C illustrates how the guide jig is engaged with the engagement partners with different thicknesses.

FIGS. 18A to 18C illustrate how the guide jig 110A is engaged with a plurality of engagement partners with different thicknesses.

An example in which the engagement partners with different thicknesses include a clutch housing 30A (a portion thereof around a through hole 31A; see FIG. 18A) with a thickness D, a clutch housing 30B (a portion thereof around a through hole 31B; see FIG. 18B) with a thickness E, and a clutch housing 30C (a portion thereof around a through hole 31C; see FIG. 18C) with a thickness F (F>D>E) will be described below.

The guide jig 110A is a guide jig that regulates the direction (direction of insertion) of the greasing pipe 130 (grease ejection pipe), and includes a guide jig body 112 (the projecting portion 112 according to the first embodiment) and an engagement portion 200 provided in the guide jig body 112 to be engaged with an engagement partner with the guide jig 110A positioned with respect to the engagement partner as illustrated in FIG. 17. In the fifth embodiment, three engagement portions 200A, 200B, and 200C are provided in correspondence with three engagement partners with different thicknesses (the clutch housing 30A with the thickness D, the clutch housing 30B with the thickness E, and the clutch housing 30C with the thickness F).

The guide jig body 112 includes guide through holes (a first hole 113 and a second hole 114) formed therein to extend toward the relevant portion C (see FIG. 9) with the engagement portion 200 (engagement portion 200A, 200B, 200C) engaged with the engagement partner (see FIGS. 18A to 18C) and to guide the direction of insertion of the second jig 120 (an example of an insertion portion according to the present disclosure) to be inserted into the through hole and moved in the direction of the arrow AR7 toward the relevant portion C (see FIG. 17).

The engagement portion 200 includes three projecting portions 201, 202, and 203. The projecting portion 201 corresponds to a part of the base portion 111 according to the first embodiment. The projecting portion 203 corresponds to the key portion 116 according to the first embodiment.

The three projecting portions 201, 202, and 203 are each a plate-like portion that extends in the Y direction (a direction that is orthogonal to the sheet surface in FIG. 17), and are disposed in line in this order toward the direction of insertion AR7.

Gaps G1 and G2 between adjacent projecting portions, among the three projecting portions 201, 202, and 203, are set to have different lengths D and E (D>E), respectively.

Specifically, as illustrated in FIG. 17, the gap G1 between adjacent projecting portions 201 and 202, among the three projecting portions 201, 202, and 203, is set to have the length D corresponding to the thickness of the clutch housing 30A (the portion thereof around the through hole 31A; see FIG. 18A) which is a first engagement partner. The projecting portions 201 and 202 and a portion 117a (bottom portion) of the guide jig body 112 between the projecting portions 201 and 202 constitute the first engagement portion 200A.

As illustrated in FIG. 18A, the first engagement portion 200A is engaged with the clutch housing 30A (the portion thereof around the through hole 31A) with the thickness D as an engagement partner, with an edge portion of the clutch housing 30A (the portion thereof around the through hole 31A) with the thickness D as an engagement partner inserted into the gap G1 abutting against the portion 117a between the projecting portion 201 and the projecting portion 202, with the projecting portion 201 abutting against a main surface on one side of the clutch housing 30A (the portion thereof around the through hole 31A; see FIG. 18A) with the thickness D as an engagement partner inserted into the gap G1, and with the projecting portion 202 abutting against a main surface on the other side of the clutch housing 30A. In this manner, the guide jig 110A is engaged (fixed) in the state of being positioned with respect to the clutch housing 30A (the portion thereof around the through hole 31A) with the thickness D as an engagement partner.

On the other hand, as illustrated in FIG. 17, the gap G2 between adjacent projecting portions 202 and 203, among the three projecting portions 201, 202, and 203, is set to have the length E corresponding to the thickness of the clutch housing 30B (the portion thereof around the through hole 31B; see FIG. 18B) which is a second engagement partner. The projecting portions 202 and 203 and a portion 117b (bottom portion) of the guide jig body 112 between the projecting portions 202 and 203 constitute the second engagement portion 200B.

As illustrated in FIG. 18B, the second engagement portion 200B is engaged with the clutch housing 30B (the portion thereof around the through hole 31B) with the thickness E as an engagement partner, with an edge portion of the clutch housing 30B (the portion thereof around the through hole 31B) with the thickness E as an engagement partner inserted into the gap G2 abutting against the portion 117b between the projecting portion 202 and the projecting portion 203, with the projecting portion 202 abutting against a main surface on one side of the clutch housing 30B (the portion thereof around the through hole 31B; see FIG. 18B) with the thickness E as an engagement partner inserted into the gap G2, and with the projecting portion 203 abutting against a main surface on the other side of the clutch housing 30B. In this manner, the guide jig 110A is engaged (fixed) in the state of being positioned with respect to the clutch housing 30B (the portion thereof around the through hole 31B) with the thickness E as an engagement partner.

As illustrated in FIG. 17, a gap G3 between the projecting portions 201 and 203 positioned at both ends in the direction of insertion AR7, among the three projecting portions 201, 202, and 203, is set to have the length F corresponding to the thickness of the clutch housing 30C (the portion thereof around the through hole 31C; see FIG. 18C) as a third engagement partner. The projecting portions 201 and 203 and a distal end portion 202a of the projecting portion 202 constitute the third engagement portion 200C.

As illustrated in FIG. 18C, the third engagement portion 200C is engaged with the clutch housing 30C (the portion thereof around the through hole 31C) with the thickness F as an engagement partner, with an edge portion of the clutch housing 30C (the portion thereof around the through hole 31C) with the thickness F as an engagement partner inserted into the gap G3 abutting against the portion (the distal end portion 202a of the projecting portion 202) between the projecting portion 201 and the projecting portion 203, with the projecting portion 201 abutting against a main surface on one side of the clutch housing 30C (the portion thereof around the through hole 31C; see FIG. 18C) with the thickness F as an engagement partner inserted into the gap G3, and with the projecting portion 203 abutting against a main surface on the other side of the clutch housing 30C. In this manner, the guide jig 110A is engaged (fixed) in the state of being positioned with respect to the clutch housing 30C (the portion thereof around the through hole 31C) with the thickness F as an engagement partner.

With the fifth embodiment, as has been described above, it is possible to provide a guide jig 110A to be engaged (fixed) in the state of being positioned with respect to an engagement partner (a plurality of engagement partners with different thicknesses).

Figure 19:
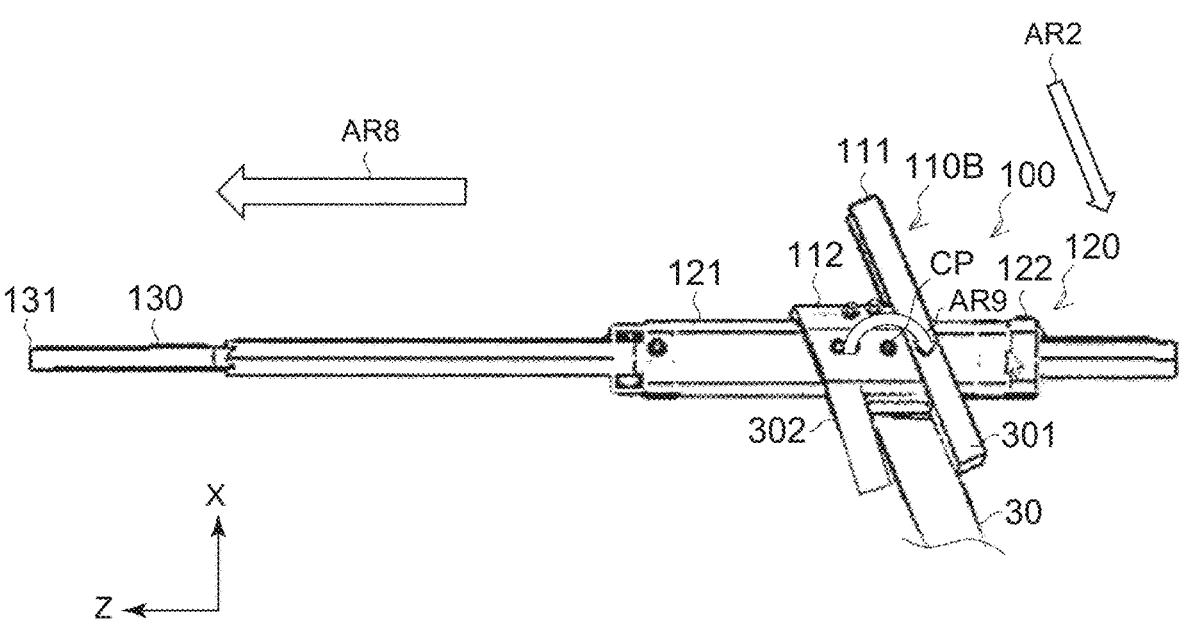
FIG. 19 is a side view of a guide jig into which the second jig is inserted.

Next, a guide jig 110B according to a sixth embodiment will be described. FIG. 19 is a side view of the guide jig 110B into which the second jig 120 is inserted. FIG. illustrates the guide jig 110B extracted from FIG. 19.

The guide jig 110B is configured similarly to the first jig 110 according to the first embodiment, but is different from the first jig 110 according to the first embodiment in including an engagement portion 300 to be engaged with a plurality of engagement partners with different thicknesses.

The differences from the first jig 110 will be mainly described below, and components that are identical to those of the first jig 110 are given like signs to omit description thereof as appropriate.

At least one of the guide jig 110B and the second jig 120 is made of a resin. When one of the jigs is made of a resin, the other may be made of a resin, or may be made of metal. It is desirable that the guide jig 110B should be made of a material that has appropriate rigidity and a tightening margin to secure a friction force.

Figure 20:
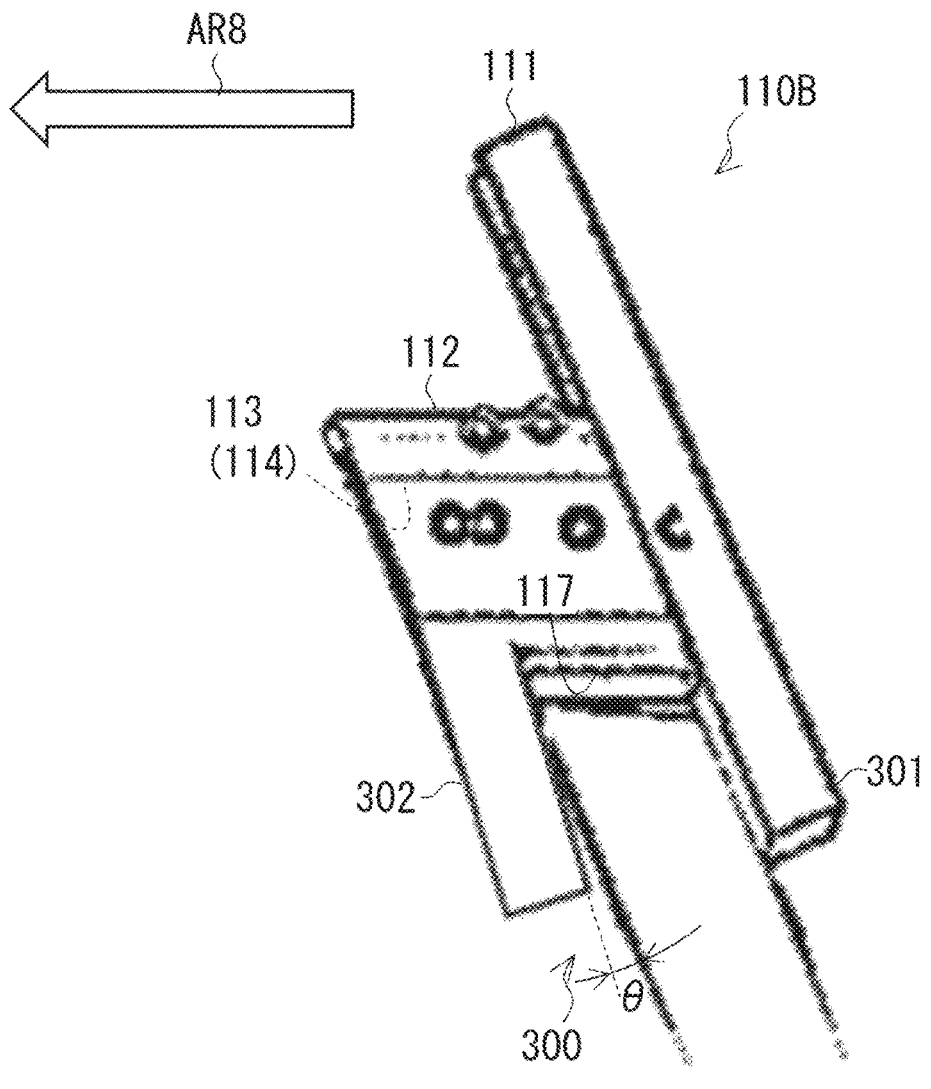
FIG. 20 illustrates the guide jig extracted from FIG. 19.

The guide jig 110B is a guide jig that regulates the direction (direction of insertion) of the greasing pipe 130 (grease ejection pipe), and includes a guide jig body 112 (the projecting portion 112 according to the first embodiment) and an engagement portion 300 provided in the guide jig body 112 to be engaged with an engagement partner with the guide jig body 112 positioned with respect to the engagement partner as illustrated in FIG. 20.

The guide jig body 112 includes guide through holes (a first hole 113 and a second hole 114) formed therein to extend toward the relevant portion C (see FIG. 9) with the engagement portion 300 engaged with the engagement partner and to guide the direction of insertion of the second jig 120 (an example of an insertion portion according to the present disclosure) to be inserted into the through hole and moved in the direction of the arrow AR8 toward the relevant portion C.

The engagement portion 300 includes two projecting portions 301 and 302. The projecting portion 301 corresponds to a part of the base portion 111 according to the first embodiment. The projecting portion 302 corresponds to the key portion 116 according to the first embodiment.

The two projecting portions 301 and 302 are each a plate-like portion that extends in the Y direction (a direction that is orthogonal to the sheet surface in FIG. 20), and are disposed in line in this order toward the direction of insertion AR8.

The gap between the two projecting portions 301 and 302 becomes wider toward the distal ends of the projecting portions 301 and 302. Specifically, one projecting portion 301, of the two projecting portions 301 and 302, is inclined with respect to the other projecting portion 302 by an angle θ (see FIG. 20). The projecting portions 301 and 302 and the portion 117 (bottom portion) of the guide jig body 112 between the projecting portion 301 and the projecting portion 302 constitute the engagement portion 300.

One projecting portion 302 has been notched (processed to have a plurality of fine undulations or an uneven shape) to abut against at least a part of an engagement partner to be inserted into the gap between the projecting portions 301 and 302. The other projecting portion 301 may have been notched (to have a plurality of fine undulations or an uneven shape).

Figure 21A:
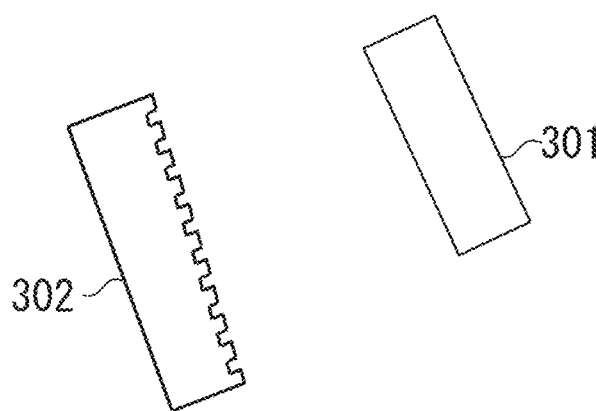
FIG. 21A illustrates a projecting portion that has been notched into a rectangular wave shape.
Figure 21B:
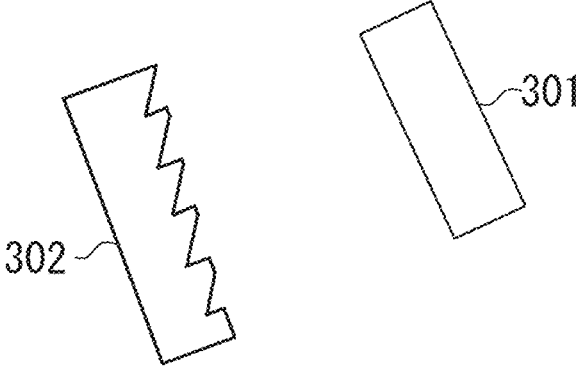
FIG. 21B illustrates a projecting portion that has been notched into a sawtooth wave shape.

FIG. 21A illustrates an example of notching in a rectangular wave shape. FIG. 21B illustrates an example of notching in a sawtooth wave shape.

The weight balance of the guide jig 110B, into which the second jig 120 has been inserted, is set so as to be rotated clockwise (see the arrow AR9) about a center of gravity CP of the guide jig 110B by its own weight as illustrated in FIG. 19.

Next, an example of operation to engage the guide jig 110B with an engagement partner will be described.

Figure 22A:
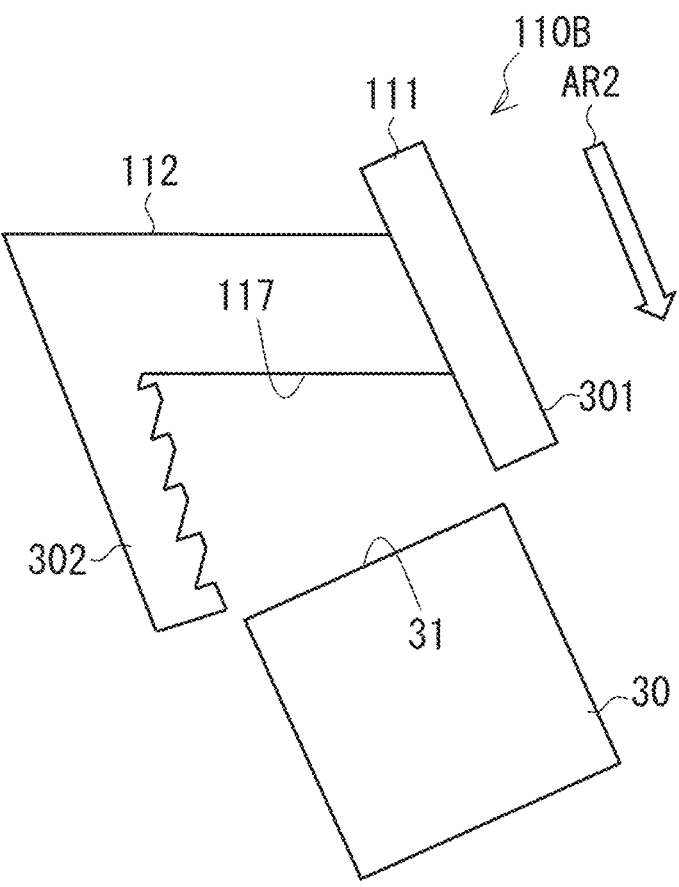
FIG. 22A illustrates an example of operation to engage the guide jig with an engagement partner.
Figure 22B:
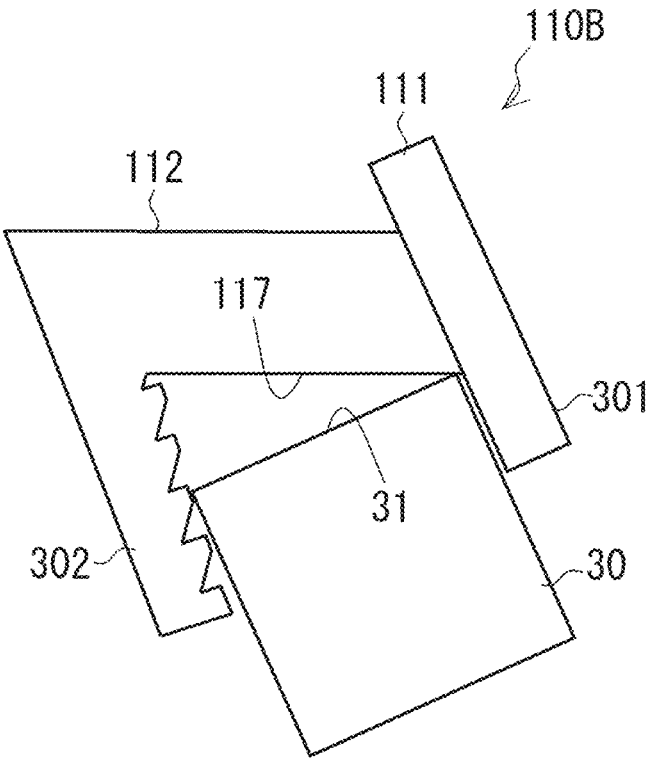
FIG. 22B illustrates an example of operation to engage the guide jig with the engagement partner.
Figure 22C:
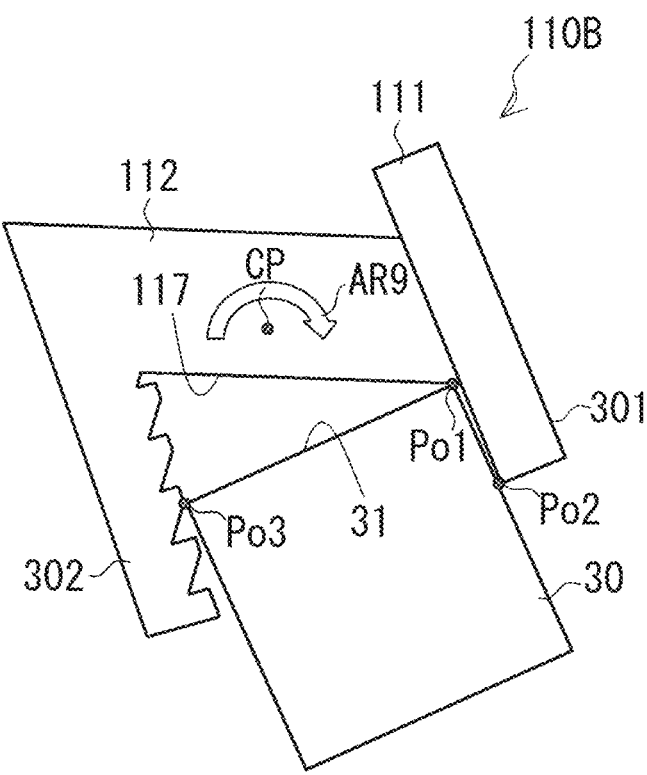
FIG. 22C illustrates an example of operation to engage the guide jig with the engagement partner.

FIGS. 22A to 22C illustrate an example of operation to engage the guide jig 110B with an engagement partner.

First, as illustrated in FIG. 22A, the gap between the projecting portions 301 and 302 and an edge portion of the clutch housing 30 (a portion thereof around the through hole 31) are caused to face each other.

Next, the guide jig 110B is pushed in the direction of the arrow AR2 (see FIG. 22A).

Specifically, the guide jig 110B is grasped, and the guide jig 110B is pushed in the direction of the arrow AR2 (see FIG. 22A) until the portion of the clutch housing 30 around the through hole 31 is inserted into the gap between the projecting portions 301 and 302 of the guide jig 110B and the portion of the clutch housing 30 around the through hole 31 abuts against the bottom portion 117 of the guide jig 110B between the projecting portions 301 and 302 as illustrated in FIG. 22B. In that event, the guide jig 110B is attached (engaged) more easily when the projecting portion 302 has been notched to have a sawtooth wave shape (see FIG. 21B), which has a gentler gradient and therefore a lower catching resistance.

Next, the guide jig 110B is released from a hand. Then, as illustrated in FIG. 22C, the guide jig 110B is rotated clockwise (see the direction of the arrow AR9) about the center of gravity CP by its own weight, and engaged in the state of abutting against the clutch housing 30 (the portion thereof around the through hole 31) as an engagement partner at three points Po1, Po2, and Po3. Consequently, a necessary normal reaction (see sign N' in FIG. 23A and sign N in FIG. 23B) and a friction force can be secured, and backlash can be suppressed against an external force such as vibration caused during work, making it possible to keep the posture of the guide jig 110B stable.

Figure 23A:
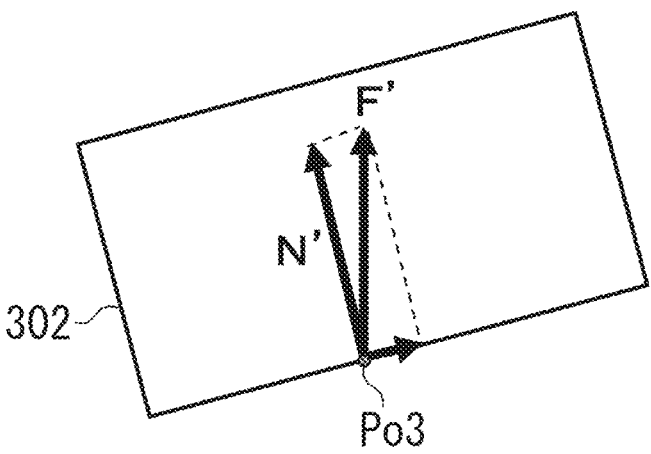
FIG. 23A illustrates vectors that represent forces applied to a point of abutment between the projecting portion and the clutch housing (a portion thereof around the through hole) when the projecting portion has been notched into a rectangular wave shape.
Figure 23B:
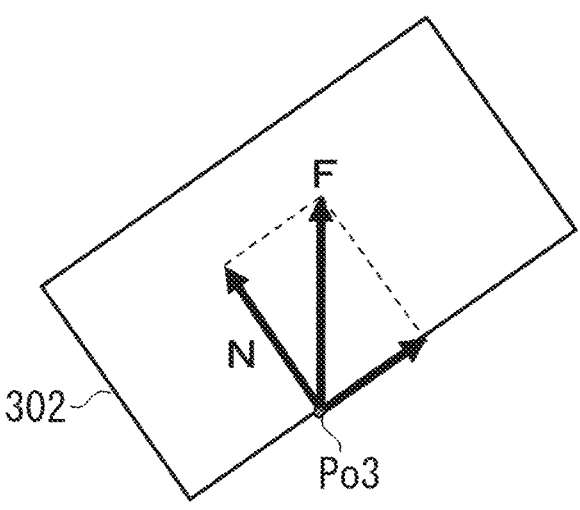
FIG. 23B illustrates vectors that represent forces applied to the point of abutment between the projecting portion and the clutch housing (a portion thereof around the through hole) when the projecting portion has been notched into a sawtooth wave shape.

FIG. 23A illustrates vectors that represent forces applied to a point of abutment Po3 between the projecting portion 302 and the clutch housing 30 (a portion thereof around the through hole 31) when the projecting portion 302 has been notched into a rectangular wave shape. FIG. 23B illustrates vectors that represent forces applied to the point of abutment Po3 between the projecting portion 302 and the clutch housing 30 (a portion thereof around the through hole 31) when the projecting portion 302 has been notched into a sawtooth wave shape. With reference to FIGS. 23A and 23B, the necessary normal reaction is larger (N'>N) when the projecting portion has been notched into a rectangular wave shape (see FIG. 23A) than when the projecting portion has been notched into a sawtooth wave shape (see FIG. 23B), and therefore the guide jig 110B can be engaged with the engagement partner more securely when the projecting portion has been notched into a sawtooth wave shape.

The gap between the two projecting portions 301 and 302 becomes wider toward the distal ends of the projecting portions 301 and 302. That is, one projecting portion 301, of the two projecting portions 301 and 302, is inclined by an angle θ (see FIG. 20) with respect to the other projecting portion 302. Therefore, the guide jig 110B can be engaged with a plurality of engagement partners with different thicknesses.

With the sixth embodiment, as has been described above, it is possible to provide a guide jig 110B to be engaged (fixed) in the state of being positioned with respect to an engagement partner (a plurality of engagement partners with different thicknesses).

Next, modifications of the first and sixth embodiments will be described.

While grease is used as a fluidic substance in the first to sixth embodiments, this is not limiting. For example, fluid may be used as the fluidic substance. In this case, the relevant portion C needs supply of fluid. Alternatively, a fluidic substance other than grease and fluid may also be used as the fluidic substance.

While the insertion portion 121 of the second jig 120 is provided with the first protruding portions p1a and p1b in the third and fourth embodiments, this is not limiting. For example, the greasing pipe 130 may be provided with the first protruding portions p1a and p1b when the second jig 120 is omitted.

Figure 24A:
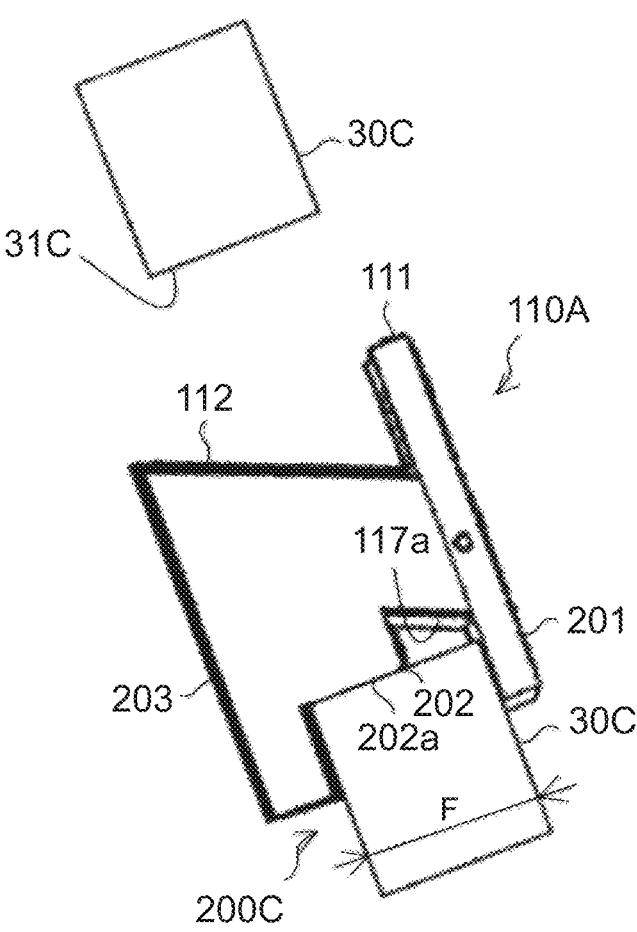
FIG. 24A is a view obtained by omitting an engagement portion illustrated in FIG. 18B from FIG. 18C.
Figure 24B:
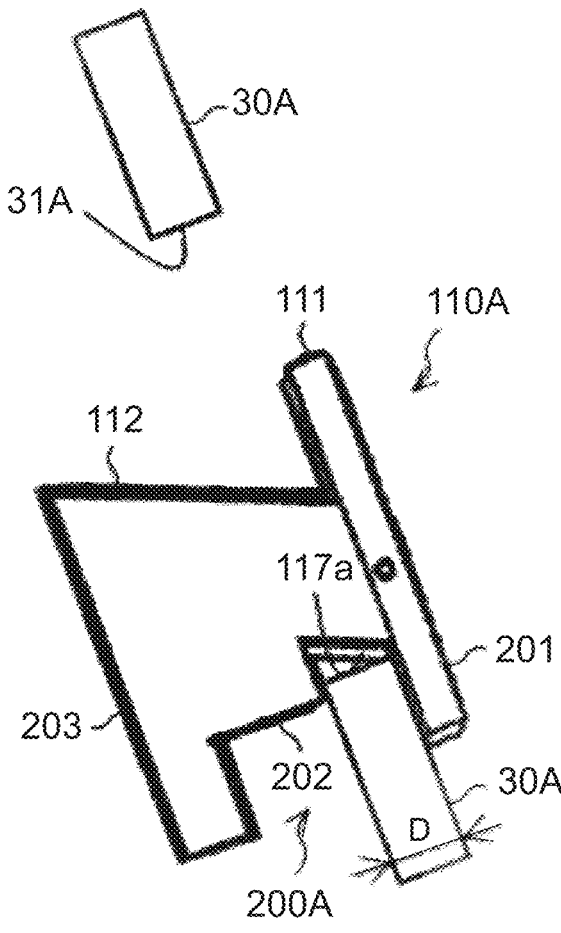
FIG. 24B is a view obtained by omitting the engagement portion illustrated in FIG. 18B from FIG. 18A.

While the guide jig 110A is provided with three engagement portions 200A, 200B, and 200C in the fifth embodiment, this is not limiting. For example, the guide jig 110A may have a stepped shape with no engagement portion 200B as illustrated in FIGS. 24A and 24B. FIG. 24A is a view obtained by omitting the engagement portion 200B from FIG. 18C. FIG. 24B is a view obtained by omitting the engagement portion 200B from FIG. 18A.

While the second jig 120 is provided with the greasing pipe 130 in the first to sixth embodiments, this is not limiting. For example, the greasing pipe 130 may be omitted. This allows performing a narrow space inspection using the endoscope 160. In this case, the relevant portion C needs to be subjected to a narrow space inspection. While the second jig 120 is provided with the endoscope 160 in the first to sixth embodiments, this is not limiting. For example, the endoscope 160 may be omitted.

While the insertion amount grasping device according to the first to sixth embodiments of the present disclosure is applied to the vehicle field (maintenance with grease ejection for clutch release mechanisms), this is not limiting. For example, the insertion amount grasping device according to the present disclosure may be applied to various fields other than the vehicle field such as the medical field. For example, while the clutch housing (a portion thereof around the through hole 31) is used as a fixation partner in the first to sixth embodiments, this is not limiting. That is, the fixation partner may be a fixation partner that matches the field to which the insertion amount grasping device according to the present disclosure is applied. Likewise, while the clutch housing 30 is used as a cover member in the first to sixth embodiments, this is not limiting. That is, the cover member may be a cover member that matches the field to which the insertion amount grasping device according to the present disclosure is applied.

As a matter of course, the numerical values indicated in the above embodiments are all exemplary, and different numerical values may also be used as appropriate.

The above embodiments are merely exemplary in all respects. The present disclosure should not be construed as being limited by the above description of the embodiments. The present disclosure can be embodied in various other forms without departing from the spirit and main features of the disclosure.

What is claimed is:

1. A guide jig comprising:
a guide jig body; and
an engagement portion provided on the guide jig body and configured to be engaged with an engagement partner with the guide jig body positioned with respect to the engagement partner, wherein:
the guide jig body includes a guide through hole provided as a through hole extending toward a relevant portion with the engagement portion engaged with the engagement partner and configured to guide a direction of insertion of an insertion portion to be inserted into the through hole and moved toward the relevant portion;
the engagement portion includes at least three projecting portions on a surface of a part of the guide jig body;
the at least three projecting portions are disposed in line in the direction of insertion; and
a gap between adjacent projecting portions, among the at least three projecting portions, is set to have a length corresponding to a thickness of the engagement partner; and
wherein the gaps between adjacent projecting portions, among the at least three projecting portions, are set to have different lengths;
wherein a gap between adjacent projecting portions, among the at least three projecting portions, becomes wider toward distal ends of the projecting portions.

2. The guide jig according to claim 1, wherein projection lengths of projecting portions positioned at both ends in the direction of insertion, among the at least three projecting portions, are longer than a projection length of the other projecting portion.

3. The guide jig according to claim 1, wherein the adjacent projecting portions being notched to abut against at least a part of the engagement partner to be inserted into the gap.

4. The guide jig according to claim 1, wherein projection lengths of projecting portions positioned at both ends in the direction of insertion, among the at least three projecting portions, are longer than a projection length of the other projecting portion.

5. The guide jig according to claim 1, wherein the guide jig is made of metal.

6. The guide jig according to claim 1, wherein the guide jig is made of resin.

7. The guide jig according to claim 1, wherein the guide jig is an integrally molded product.

8. A guide jig comprising:
a guide jig body; and
an engagement portion provided on the guide jig body and configured to be engaged with an engagement partner with the guide jig body positioned with respect to the engagement partner, wherein:
the guide jig body includes a guide through hole provided as a through hole extending toward a relevant portion with the engagement portion engaged with the engagement partner and configured to guide a direction of insertion of an insertion portion to be inserted into the through hole and moved toward the relevant portion;
the engagement portion includes at least three projecting portions on a surface of a part of the guide jig body;
the at least three projecting portions are disposed in line in the direction of insertion; and
a gap between adjacent projecting portions, among the at least three projecting portions, is set to have a length corresponding to a thickness of the engagement partner; and wherein the gaps between adjacent projecting portions, among the at least three projecting portions, are set to have different lengths;

wherein a gap between adjacent projecting portions, among the at least three projecting portions, becomes wider toward distal ends of the projecting portions;

wherein one projecting portion of the adjacent projecting portions is inclined with respect to the other projecting portion.

9. The guide jig according to claim 8, wherein projection lengths of projecting portions positioned at both ends in the direction of insertion, among the at least three projecting portions, are longer than a projection length of the other projecting portion.

10. The guide jig according to claim 8, wherein the adjacent projecting portions being notched to abut against at least a part of the engagement partner to be inserted into the gap.

11. The guide jig according to claim 8, wherein projection lengths of projecting portions positioned at both ends in the direction of insertion, among the at least three projecting portions, are longer than a projection length of the other projecting portion.

12. The guide jig according to claim 8, wherein the guide jig is made of metal.

13. The guide jig according to claim 8, wherein the guide jig is made of resin.

14. The guide jig according to claim 8, wherein the guide jig is an integrally molded product.

15. A guide jig comprising:

a guide jig body; and an engagement portion provided on the guide jig body and configured to be engaged with an engagement partner with the guide jig body positioned with respect to the engagement partner, wherein:

the guide jig body includes a guide through hole provided as a through hole extending toward a relevant portion with the engagement portion engaged with the engagement partner and configured to guide a direction of insertion of an insertion portion to be inserted into the through hole and moved toward the relevant portion;

the engagement portion includes at least three projecting portions on a surface of a part of the guide jig body;

the at least three projecting portions are disposed in line in the direction of insertion; and a gap between adjacent projecting portions, among the at least three projecting portions, is set to have a length corresponding to a thickness of the engagement partner; and wherein the gaps between adjacent projecting portions, among the at least three projecting portions, are set to have different lengths;

wherein a gap between adjacent projecting portions, among the at least three projecting portions, becomes wider toward distal ends of the projecting portions;

wherein one projecting portion of the adjacent projecting portions is inclined with respect to the other projecting portion;

wherein the one projecting portion or the other projecting portion of the adjacent projecting portions has been notched to abut against at least a part of the engagement partner to be inserted into the gap.

16. The guide jig according to claim 15, wherein projection lengths of projecting portions positioned at both ends in the direction of insertion, among the at least three projecting portions, are longer than a projection length of the other projecting portion.

17. The guide jig according to claim 15, wherein the adjacent projecting portions being notched to abut against at least a part of the engagement partner to be inserted into the gap.

18. The guide jig according to claim 15, wherein the guide jig is made of metal.

19. The guide jig according to claim 15, wherein the guide jig is made of resin.

20. The guide jig according to claim 15, wherein the guide jig is an integrally molded product.

* * * * *